US012105928B2

(12) United States Patent
Anderson et al.

(10) Patent No.: US 12,105,928 B2
(45) Date of Patent: Oct. 1, 2024

(54) SELECTIVELY AUGMENTING COMMUNICATIONS TRANSMITTED BY A COMMUNICATION DEVICE

(71) Applicant: Tahoe Research, Ltd., Dublin (IE)

(72) Inventors: Glen J. Anderson, Beaverton, OR (US); Jose K. Sia, Jr., Portland, OR (US); Wendy March, Portland, OR (US)

(73) Assignee: Tahoe Research, Ltd., Dublin (IE)

( * ) Notice: Subject to any disclaimer, the term of this patent is extended or adjusted under 35 U.S.C. 154(b) by 0 days.

(21) Appl. No.: 17/650,590

(22) Filed: Feb. 10, 2022

(65) Prior Publication Data

US 2022/0269392 A1 Aug. 25, 2022

Related U.S. Application Data

(63) Continuation of application No. 15/688,294, filed on Aug. 28, 2017, now abandoned, which is a (Continued)

(51) Int. Cl.
  *G06F 3/04817* (2022.01)
  *G06F 3/01* (2006.01)
  (Continued)

(52) U.S. Cl.
  CPC .......... *G06F 3/04817* (2013.01); *G06F 3/011* (2013.01); *H04M 1/72454* (2021.01);
  (Continued)

(58) Field of Classification Search
  CPC .... G06F 3/04817; G06F 3/011; G06F 3/1454; G06F 2203/011; H04M 1/72454; H04M 1/7243
  See application file for complete search history.

(56) References Cited

U.S. PATENT DOCUMENTS 6,466,232 B1 10/2002 Newell et al.
7,136,818 B1 * 11/2006 Cosatto ............... G10L 15/1807
                                                      704/E21.02
(Continued)

OTHER PUBLICATIONS

United States Patent and Trademark Office, "Non-Final Office Action," issued in connection with U.S. Appl. No. 13/631,522, dated Jul. 14, 2014, 14 pages.
(Continued)

*Primary Examiner* — Motilewa Good-Johnson
(74) *Attorney, Agent, or Firm* — Studebaker & Brackett PC

(57) ABSTRACT

Technologies for selectively augmenting communications transmitted by a communication device include a communication device configured to acquire new user environment information relating to the environment of the user if such new user environment information becomes available. The communication device is further configured to create one or more user environment indicators based on the new user environment information, to display the one or more created user environment indicators via a display of the communication device and include the created user environment indicator in a communication to be transmitted by the communication device if the created user environment indicator is selected for inclusion in the communication.

40 Claims, 9 Drawing Sheets

Related U.S. Application Data continuation of application No. 13/631,522, filed on Sep. 28, 2012, now Pat. No. 9,746,990.

(51) Int. Cl.
  *G06F 3/14* (2006.01)
  *H04M 1/7243* (2021.01)
  *H04M 1/72454* (2021.01)

(52) U.S. Cl.
  CPC ...... *G06F 3/1454* (2013.01); *G06F 2203/011* (2013.01); *H04M 1/7243* (2021.01)

(56) References Cited

U.S. PATENT DOCUMENTS

| | | | |
|---|---|---|---|
| 7,434,176 B1 | 10/2008 | Froloff | |
| 7,528,867 B2 | 5/2009 | Ishiyama et al. | |
| 7,689,524 B2 | 3/2010 | Ozzie et al. | |
| 7,913,176 B1* | 3/2011 | Blattner | H04L 51/04 |
| | | | 715/758 |
| 8,004,529 B2 | 8/2011 | Wood et al. | |
| 8,086,275 B2 | 12/2011 | Wykes et al. | |
| 8,271,902 B1 | 9/2012 | Mangini et al. | |
| 8,306,515 B2 | 11/2012 | Ryu et al. | |
| 8,375,327 B2 | 2/2013 | Lorch et al. | |
| 8,402,378 B2* | 3/2013 | Blattner | H04L 51/00 |
| | | | 715/758 |
| 8,413,055 B2 | 4/2013 | Yuen et al. | |
| 8,456,294 B2* | 6/2013 | Emigh | H04W 4/02 |
| | | | 340/936 |
| 8,558,687 B2 | 10/2013 | Haupt et al. | |
| 8,601,381 B2 | 12/2013 | Roseway et al. | |
| 8,627,215 B2* | 1/2014 | Blattner | G06Q 10/107 |
| | | | 715/758 |
| 8,645,847 B2* | 2/2014 | Boss | G06F 3/011 |
| | | | 715/848 |
| 8,726,195 B2 | 5/2014 | Bill | |
| 8,824,749 B2* | 9/2014 | Leyvand | G06F 21/32 |
| | | | 382/104 |
| 9,071,709 B2 | 6/2015 | Wither et al. | |
| 9,215,095 B2* | 12/2015 | Weaver | H04L 67/306 |
| 9,282,309 B1* | 3/2016 | Cosic | H04N 9/8205 |
| 9,449,308 B2 | 9/2016 | Schiff et al. | |
| 9,457,265 B2* | 10/2016 | Wang | A63F 13/25 |
| 9,652,809 B1* | 5/2017 | Levinson | G06Q 50/01 |
| 9,741,147 B2* | 8/2017 | Allen | G06T 13/40 |
| 9,746,990 B2 | 8/2017 | Anderson et al. | |
| 9,807,130 B2* | 10/2017 | Blattner | H04L 12/1822 |
| 11,503,125 B2* | 11/2022 | Nassirzadeh | G06Q 50/01 |
| 2003/0163315 A1* | 8/2003 | Challapali | G06T 13/40 |
| | | | 704/E21.02 |
| 2004/0024822 A1 | 2/2004 | Werndorfer et al. | |
| 2005/0204309 A1 | 9/2005 | Szeto | |
| 2006/0015812 A1 | 1/2006 | Cunningham et al. | |
| 2006/0212818 A1 | 9/2006 | Lee | |
| 2007/0091085 A1* | 4/2007 | Wang | G06T 7/55 |
| | | | 345/420 |
| 2008/0216022 A1 | 9/2008 | Lorch et al. | |
| 2009/0040231 A1* | 2/2009 | Sano | A61B 5/1118 |
| | | | 345/474 |
| 2010/0007665 A1* | 1/2010 | Smith | G06T 13/40 |
| | | | 345/473 |
| 2010/0123724 A1* | 5/2010 | Moore | G06F 3/0236 |
| | | | 345/173 |
| 2010/0146407 A1* | 6/2010 | Bokor | G06F 3/0481 |
| | | | 715/757 |
| 2010/0179991 A1 | 7/2010 | Lorch et al. | |
| 2010/0309044 A1 | 12/2010 | Ische et al. | |
| 2011/0007142 A1* | 1/2011 | Perez | G06T 13/80 |
| | | | 348/E7.085 |
| 2011/0076992 A1 | 3/2011 | Chou et al. | |
| 2011/0238751 A1* | 9/2011 | Belimpasakis | H04L 67/52 |
| | | | 715/764 |
| 2011/0248992 A1* | 10/2011 | van Os | G06T 11/001 |
| | | | 345/650 |
| 2011/0289428 A1 | 11/2011 | Yuen et al. | |
| 2011/0304629 A1* | 12/2011 | Winchester | G06T 13/40 |
| | | | 345/473 |
| 2011/0320981 A1 | 12/2011 | Shen et al. | |
| 2012/0319985 A1 | 12/2012 | Moore et al. | |
| 2013/0103766 A1 | 4/2013 | Gupta | |
| 2013/0121591 A1 | 5/2013 | Hill | |
| 2013/0152000 A1 | 6/2013 | Liu et al. | |
| 2013/0159919 A1* | 6/2013 | Leydon | G06F 40/289 |
| | | | 715/780 |
| 2013/0235045 A1* | 9/2013 | Corazza | G06V 40/172 |
| | | | 345/473 |
| 2014/0035934 A1* | 2/2014 | Du | G06T 17/20 |
| | | | 345/474 |
| 2014/0082198 A1* | 3/2014 | Blattner | G06Q 10/107 |
| | | | 709/225 |
| 2014/0085334 A1* | 3/2014 | Payne | H04W 4/12 |
| | | | 345/633 |
| 2014/0092130 A1 | 4/2014 | Anderson et al. | |
| 2014/0100464 A1* | 4/2014 | Kaleal | A61B 5/486 |
| | | | 600/595 |
| 2014/0114564 A1 | 4/2014 | Callaghan et al. | |
| 2014/0115092 A1* | 4/2014 | Tofighbakhsh | H04N 21/4788 |
| | | | 709/217 |
| 2014/0152869 A1* | 6/2014 | Solotko | G06Q 10/10 |
| | | | 348/231.3 |
| 2014/0229861 A1* | 8/2014 | Hellstrom | G01C 21/20 |
| | | | 715/753 |
| 2018/0203584 A1 | 7/2018 | Anderson et al. | |

OTHER PUBLICATIONS

United States Patent and Trademark Office, "Final Office Action," issued in connection with U.S. Appl. No. 13/631,522, dated Jan. 29, 2015, 11 pages.

United States Patent and Trademark Office, "Advisory Action," issued in connection with U.S. Appl. No. 13/631,522, dated Apr. 21, 2015, 4 pages.

United States Patent and Trademark Office, "Non-Final Office Action, " issued in connection with U.S. Appl. No. 13/631,522, dated Jun. 15, 2015, 10 pages.

United States Patent and Trademark Office, "Final Office Action," issued in connection with U.S. Appl. No. 13/631,522, dated Nov. 24, 2015, 13 pages.

United States Patent and Trademark Office, "Non-Final Office Action," issued in connection with U.S. Appl. No. 13/631,522, dated May 19, 2016, 16 pages.

United States Patent and Trademark Office, "Final Office Action," issued in connection with U.S. Appl. No. 13/631,522, dated Nov. 2, 2016, 16 pages.

United States Patent and Trademark Office, "Notice of Panel Decision from Pre-Appeal Brief Review," Issued in connection with U.S. Appl. No. 13/631,522, dated Apr. 19, 2017, 2 pages.

United States Patent and Trademark Office, "Notice of Allowance and Fee(s) Due," issued in connection with U.S. Appl. No. 13/631,522, dated Apr. 25, 2017, 10 pages.

United States Patent and Trademark Office, "Non-Final Office Action," issued in connection with U.S. Appl. No. 15/688,294, dated May 17, 2018, 10 pages.

United States Patent and Trademark Office, "Final Office Action," issued in connection with U.S. Appl. No. 15/688,294, dated Nov. 5, 2018, 26 pages.

United States Patent and Trademark Office, "Advisory Action," issued in connection with U.S. Appl. No. 15/688,294, dated Jan. 29, 2019, 3 pages.

United States Patent and Trademark Office, "Non-Final Office Action," issued in connection with U.S. Appl. No. 15/688,294, dated Jul. 19, 2019, 51 pages.

United States Patent and Trademark Office, "Final Office Action," issued in connection with U.S. Appl. No. 15/688,294, dated Dec. 17, 2019, 50 pages.

(56) References Cited

OTHER PUBLICATIONS

United States Patent and Trademark Office, "Advisory Action," issued in connection with U.S. Appl. No. 15/688,294, dated Jun. 4, 2020, 2 pages.

United States Patent and Trademark Office, "Examiner's Answer to Appeal Brief," issued in connection with U.S. Appl. No. 15/688,294, dated Jun. 9, 2020, 27 pages.

United States Patent and Trademark Office, "Patent Board Decision," issued in connection with U.S. Appl. No. 15/688,294, dated Dec. 15, 2021, 11 pages.

* cited by examiner

SELECTIVELY AUGMENTING COMMUNICATIONS TRANSMITTED BY A COMMUNICATION DEVICE

CROSS-REFERENCE TO RELATED APPLICATIONS

This patent arises from a continuation of U.S. application Ser. No. 15/688,294, titled "Selectively Augmenting Communications Transmitted by a Communication Device," filed Aug. 28, 2017, which is a continuation of U.S. application Ser. No. 13/631,522 (now U.S. Pat. No. 9,746,990), titled "Selectively Augmenting Communications Transmitted by a Communication Device," filed Sep. 28, 2012, both of which are hereby incorporated by this reference in their entireties.

BACKGROUND

Mobile and desktop communication devices are becoming ubiquitous tools for communication between two or more remotely located persons. While some such communication is accomplished using voice and/or video technologies, a large share of communication in business, personal and social networking contexts utilizes textual technologies. In some applications, textual communications may be supplemented with graphic content in the form of avatars, animations and the like.

Modern communication devices are equipped with increased functionality, processing power and data storage capability to allow such devices to perform advanced processing. For example, many modern communication devices, such as typical "smart phones," are capable of monitoring, capturing and analyzing large amounts data relating to their surrounding environment. Additionally, many modern communication devices are capable of connecting to various data networks, including the Internet, to retrieve and receive data communications over such networks.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
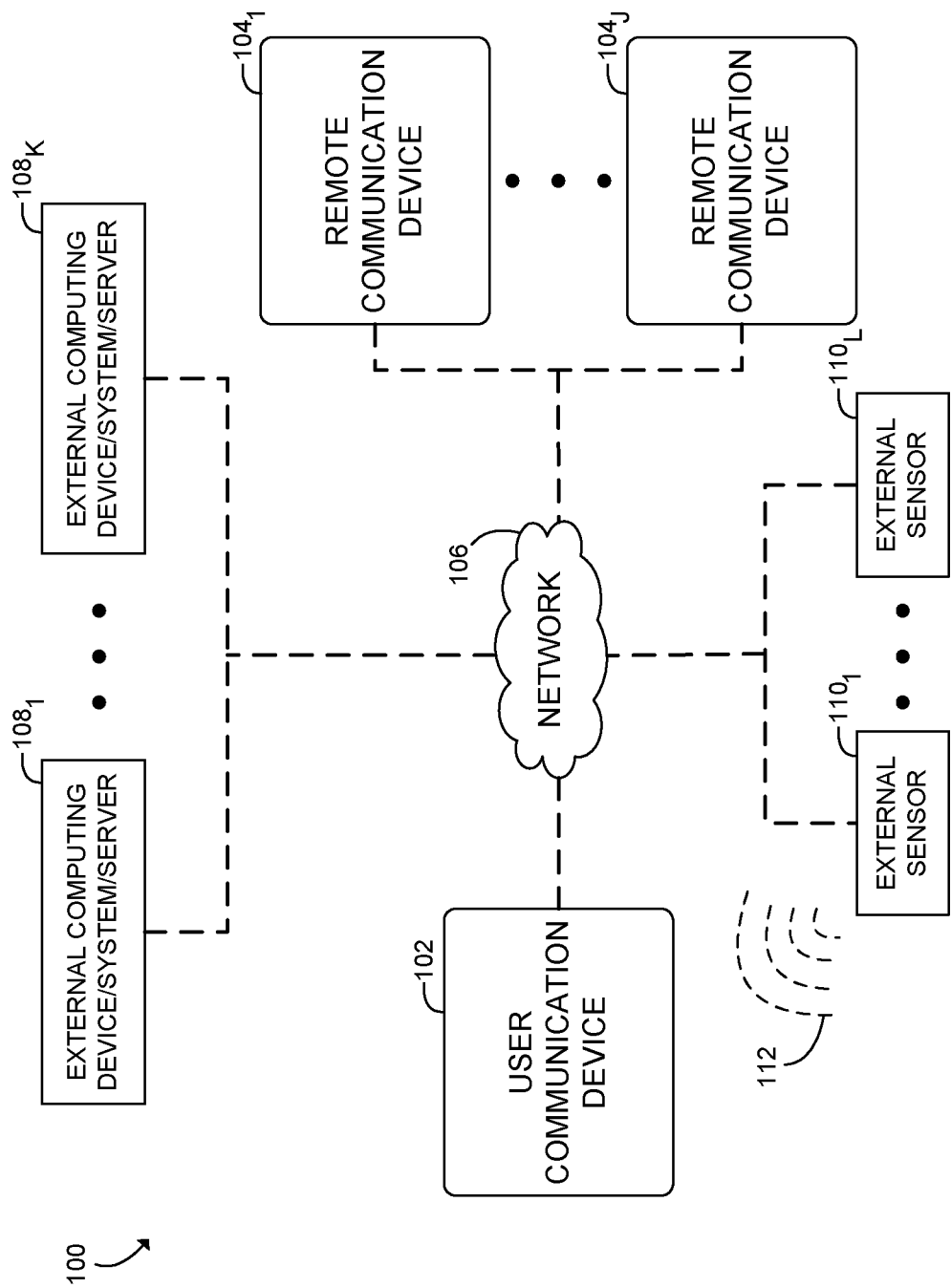
FIG. 1 is a simplified block diagram of at least one embodiment of a system for selectively augmenting communications transmitted by a communication device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for augmenting communications includes a user communication device 102 communicatively coupled to any number, J, of remote communication devices $104_1$-$104_J$, where J may be any positive integer, via a network 106. As discussed in more detail below, the user communication device 102 is configured to acquire user environment information, which may relate to the user of the communication device 102 (e.g., the user's context, physical characteristics of the user, and/or other sensed aspects of the user) and/or to events or conditions surrounding the user of the communication device 102. Such user environment information may be acquired from one or more devices and/or sensors on-board the user communication device 102 and/or from one or more sensors $110_1$-$110_L$ external to the user communication device 102, where L may be any positive integer. Alternatively or additionally, user environment information may be produced by one or more application programs executed by the user communication device 102, and/or by one or more external devices, systems or servers $108_1$-$108_K$, where K may be any positive integer. In either case, such user environment information may be acquired by the user communication device 102. Examples of such user environment information may include, but should not be limited to, still images of the user, video of the user, physical characteristics of the user (e.g., gender, height, weight, hair color, etc.), activities being performed by the user, physical location of the user, audio content of the environment surrounding the user, movement of the user, proximity of the user to one or more objects, temperature of the user and/or environment surrounding the user, direction of travel of the user, humidity of the environment surrounding the user, medical condition of the user, other persons in the vicinity of the user, pressure applied by the user to the user communication device 102, and the like.

The user communication device 102 is further configured to create one or more user environment indicators based on the user environment information, and to display the one or more user environment indicators via a display of the device 102. User environment indicators may be created in the form of images, animations, audio clips, video clips, and examples of user environment indicators include, but should not be limited to, image avatars, animated avatars, sound bites, synthesized audio clips, pre-recorded audio clips, images representing current location and/or conditions, and the like. The user communication device 102 is further configured to allow the user to select one or more of the displayed user environment indicators and to include the selected one or more user environment indicators in a communication transmitted by the user communication device 102 to another device or system, e.g., to one or more of the remote communication devices $104_1$-$104_J$, and/or to one or more subscribers, viewers and/or participants of one or more social network, blogging, gaming or other services hosted by one or more external computing devices/systems/servers $108_1$-$108_K$.

The user communication device 102 may be embodied as any type of device for communicating with one or more remote devices/systems/servers and for performing the other functions described herein. For example, the user communication device 102 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a network appliance, a web appliance, a distributed computing system, a multiprocessor system, a processor-based system, a consumer electronic device, a digital television device, a set top box, and/or any other computing device configured to store and access data, and/or to execute electronic game software and related applications. A user may use multiple different user communication devices 102 to communicate with others, and the user communication device 102 illustrated in FIG. 1 will be understood to represent one or multiple such communication devices.

The one or more remote communication devices $104_1$-$104_J$ may each likewise be embodied as any type of device for communicating with one or more remote devices/systems/servers. Example embodiments of the remote communication devices $104_1$-$104_J$ may be identical to those just described with respect to the user communication device 102.

The one or more external computing devices/systems/servers $108_1$-$108_K$ may each be embodied as any type of device, system or server for communicating with the user communication device 102, any of the one or more remote communication devices $104_1$-$104_J$ and/or any of the external sensors $110_1$-$110_L$, and for performing the other functions described herein. Examples embodiments of the external computing devices/systems/servers $108_1$-$108_K$ may be identical to those just described with respect to the user communication device 102 and/or may be embodied as a conventional server, e.g., web server or the like.

The one or more external sensors $110_1$-$110_L$ may be embodied as various conventional servers configured to transmit sensory data to the user communication device 102 via the network 106 and/or via a wireless communication link 112, e.g., a wireless radio frequency link, and/or via a conventional wired communication link. Examples of the one or more external sensors $110_1$-$110_L$ may include, but should not be limited to, one or more proximity sensors, one or more radio-frequency identification (RFID) transceivers or receivers, one or more biosensors, e.g., body fluid analyte, toxic substance or other bio sensors, one or more heart rate sensors, one or more body and/or ambient temperature sensors, one or more blood pressure sensors, one or more humidity sensors, and the like.

The network 106 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the user communication device 102 and the one or more remote communication devices $104_1$-$104_1$, between the user communication device 102 and the one or more external computing devices/systems/servers $108_1$-$108_K$, and/or between the user communication device 102 and the one or more external sensors $110_1$-$110_L$, may be, in whole or in part, a wired connection. Generally, communications between the user communication device 102 and any such remote devices, systems, servers and/or sensors may be conducted via the network 106 using any one or more, or combination, of conventional secure and/or unsecure communication protocols. Examples include, but should not be limited to, a wired network communication protocol (e.g., TCP/IP), a wireless network communication protocol (e.g., Wi-Fi®, WiMAX, Ethernet, Bluetooth®, etc.), a cellular communication protocol (e.g., Wideband Code Division Multiple Access (W-CDMA)), and/or other communication protocols. As such, the network 106 may include any number of additional devices, such as additional computers, routers, and switches, to facilitate communications. In some embodiments, the network 106 may be or include a single network, and in other embodiments the network 106 may be or include a collection of networks.

Figure 2:
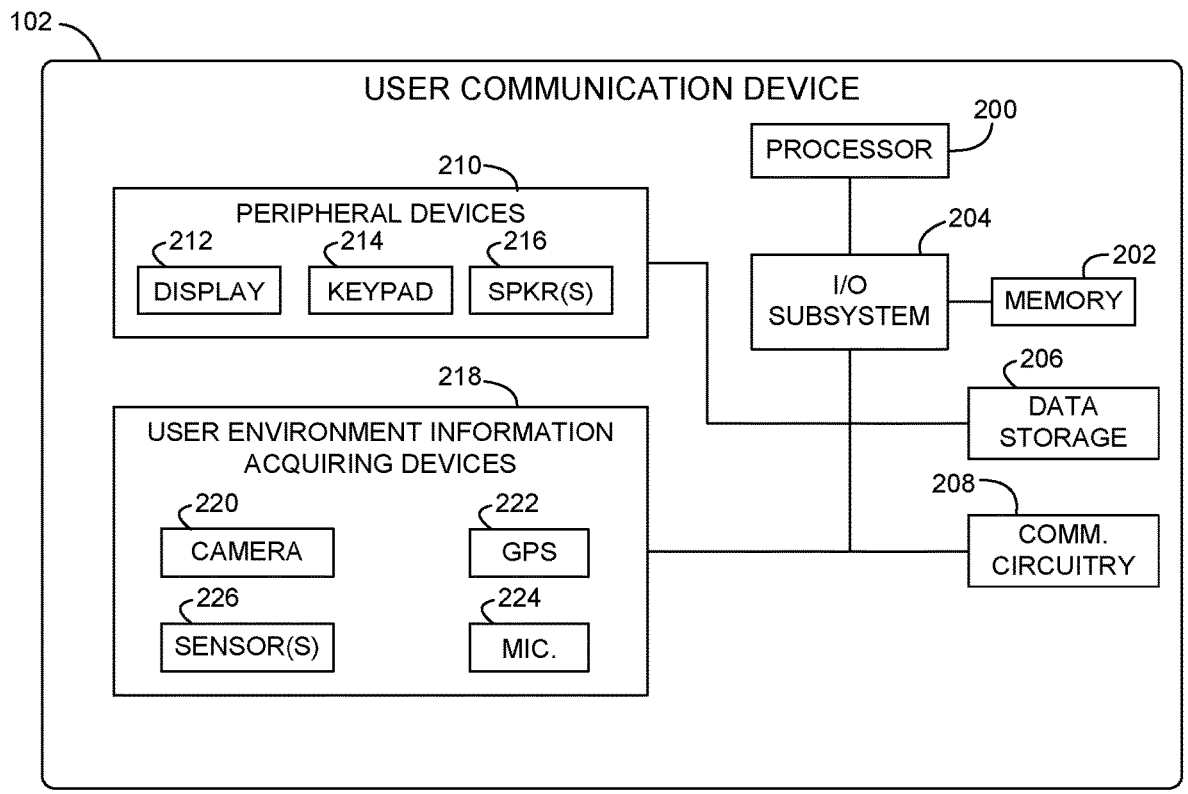
FIG. 2 is a simplified block diagram of at least one embodiment of a user communication device of the system of FIG. 1.

As shown in FIG. 2, the illustrative user communication device 102 includes a processor 200, a memory 202, an input/output subsystem 204, a data storage 206, a communication circuitry 208, a number of peripheral devices 210, and a number of user environment acquiring devices 218. In the illustrated embodiment, the number of peripheral devices may include, but should not be limited to, a display 212, a keypad 214, and one or more audio speakers 216. Of course, the user communication device 102 may include fewer, other, or additional components, such as those commonly found in conventional computer systems. Additionally, in some embodiments, one or more of the illustrative components may be incorporated in, or otherwise from a portion of, another component. For example, the memory 202, or portions thereof, may be incorporated into the processor 200 in some embodiments.

The processor 200 may be embodied as any type of processor capable of performing the functions described herein. For example, the processor may be embodied as a single or multi-core processor(s), digital signal processor, microcontroller, or other processor or processing/controlling circuit. Similarly, the memory 202 may be embodied as any type of volatile or non-volatile memory or data storage capable of performing the functions described herein. In operation, the memory 202 may store various data and software used during operation of the user communication device 102 such as operating systems, applications, programs, libraries, and drivers. The memory 202 is communicatively coupled to the processor 200 via the I/0 subsystem 204, which may be embodied as circuitry and/or components to facilitate input/output operations with the processor 200, the memory 202, and other components of the user communication device 102. For example, the I/0 subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/0 subsystem 204 may form a portion of a system-on-a-chip (SoC) and be incorporated, along with the processor 200, the memory 202, and other components of user communication device 102, on a single integrated circuit chip.

The communication circuitry 208 of the user communication device 102 may be embodied as any communication circuit, device, or collection thereof, capable of enabling communications between the user communication device 102 and any of the remote devices, systems, servers and/or sensors $104_1$-$104_1$, $108_1$-$108_K$ and/or $110_1$-$110_L$. The communication circuitry 208 may be configured to use any one or more communication technology and associated protocols, as described above, to effect such communication.

The display 212 of the user communication device 102 may be embodied as any one or more display screens on which information may be displayed to a viewer of the user communication device 102. The display may be embodied as, or otherwise use, any suitable display technology including, for example, a liquid crystal display (LCD), a light emitting diode (LED) display, a cathode ray tube (CRT) display, a plasma display, and/or other display technology currently known or developed in the future. Although only a single display 212 is illustrated in FIG. 2, it should be appreciated that the user communication device 102 may include multiple displays or display screens on which the same or different content may be displayed contemporaneously or sequentially with each other.

The data storage 206 may be embodied as any type of device or devices configured for short-term or long-term storage of data such as, for example, memory devices and circuits, memory cards, hard disk drives, solid-state drives, or other data storage devices. In the illustrative embodiment, the user communication device 102 may maintain one or more application programs, databases, user environment indicators and/or other information in the data storage 206. As discussed in more detail below, the user environment indicators may be created, stored in the data storage 206, displayed on the display 212 and transmitted to one or more of the remote communication devices $104_1$-$104_J$ and/or to one or more of the external devices/systems/servers $108_1$-$108_K$ in the form of images, animations, audio files and/or video files.

The user communication device 102 also includes a number of user environment information acquiring devices 218. Generally, the user environment information acquiring devices 218 are configured to acquire context information relating to the user of the user communication device 102 and/or to acquire information relating to the environment surrounding the user of the user communication device 102. It will be understood that information relating to the user may, but need not, include information relating to the user communication device 102 which is attributable to the user because the user is in possession of, proximate to, or in the vicinity of the user computing device 102.

In the illustrated embodiment, the user environment information acquiring devices 218 may include a camera 220, which may include forward facing and/or rearward facing camera portions and/or which may be configured to capture still images and/or video, a global positioning system (GPS) receiver 222, a microphone 224 and one or more sensors 226. Examples of the one or more sensors on-board the user communication device 102 may include, but should not be limited to, an accelerometer or other motion or movement sensor to produce sensory signals corresponding to motion or movement of the user of the user communication device 102, a magnometer to produce sensory signals from which direction of travel or orientation can be determined, a temperature sensor to produce sensory signals corresponding to temperature of or about the device 102, an ambient light sensor to produce sensory signals corresponding to ambient light surrounding or in the vicinity of the device 102, a proximity sensor to produce sensory signals corresponding to the proximity of the device 102 to one or more objects, a humidity sensor to produce sensory signals corresponding to the relative humidity of the environment surrounding the device 102, a chemical sensor to produce sensor signals corresponding to the presence and/or concentration of one or more chemicals in the air or water proximate to the device 102 or in the body of the user, a bio sensor to produce sensor signals corresponding to an analyte of a body fluid of the user, e.g., blood glucose or other analyte, or the like. In any case, the user environment information acquiring devices 218 are configured to generate user contextual information and/or contextual information about the environment surrounding the user. Contextual information about the user may include, for example, but should not be limited to the user's presence, gender, hair color, height, build, clothes, actions performed by the user, movements made by the user, facial expressions made by the user, vocal information spoken, sung or otherwise produced by the user, and/or other context data.

The camera 220 may be embodied as any type of digital camera capable of producing still or motion pictures from which the user communication device 102 may determine context data of a viewer. Similarly, the microphone 224 may be embodied as any type of audio recording device capable of capturing local sounds and producing audio signals detectable and usable by the user communication device 102 to determine context data of a user. The GPS sensor 222 may be embodied as any type of positioning system capable of determining a physical location of the user communication device 102 and therefore of the user of the device 102. Of course, it should be appreciated that the user communication device 102 may include additional or other user environment information acquiring devices and/or additional or other sensors 226 in other embodiments.

The remote communication devices $104_1$-$104_J$ may each be embodied generally as illustrated and described with respect to the user communication device 102 of FIG. 2, and may each include a processor, a memory, an I/0 subsystem, a data storage, a communication circuitry and a number of peripheral devices as such components are described above. In some embodiments, the remote communication devices $104_1$-$104_J$ may include one or more of the user environment information acquiring devices 218 illustrated in FIG. 2, although in other embodiments one or more of the remote communication devices $104_1$-$104_J$ may not include one or more of the user environment information acquiring devices illustrated in FIG. 2 and/or described above.

Figure 3:
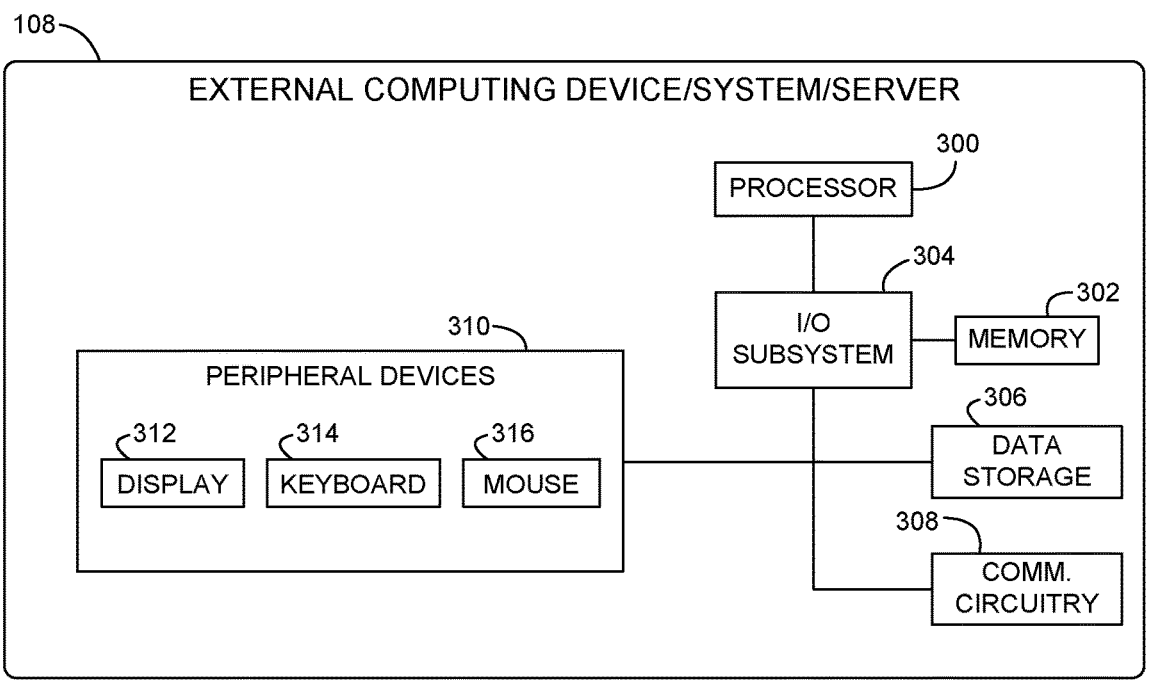
FIG. 3 is a simplified block diagram of at least one embodiment of an external computing device/system/server of the system of FIG. 1.

An embodiment of an example one of the external computing devices/systems/servers 108 is illustrated in FIG. 3, and includes a processor 300, a memory 302, an input/output subsystem 304, a data storage unit 306, a communication circuit 308, and a number of peripheral devices 310. Such components may be generally as described above with respect to FIG. 2, and a detailed explanation of such components will therefore be omitted here for brevity. The peripheral devices 310 of the external computing device/system/server 108 illustratively include a display 312, a keyboard 314 and a mouse 316 or other scrolling and/or content selection device. The display 312 may be embodied as any type of display configured for a computing device and capable of displaying data to the user. Similarly, the keyboard 314 may be embodied as any type of hard or soft keypad or keyboard for use with a computing device. Similarly, the mouse 316 may be embodied as any type of scrolling and/or content selection device capable of scrolling and/or selecting content displayed on the display 312.

Figure 4:
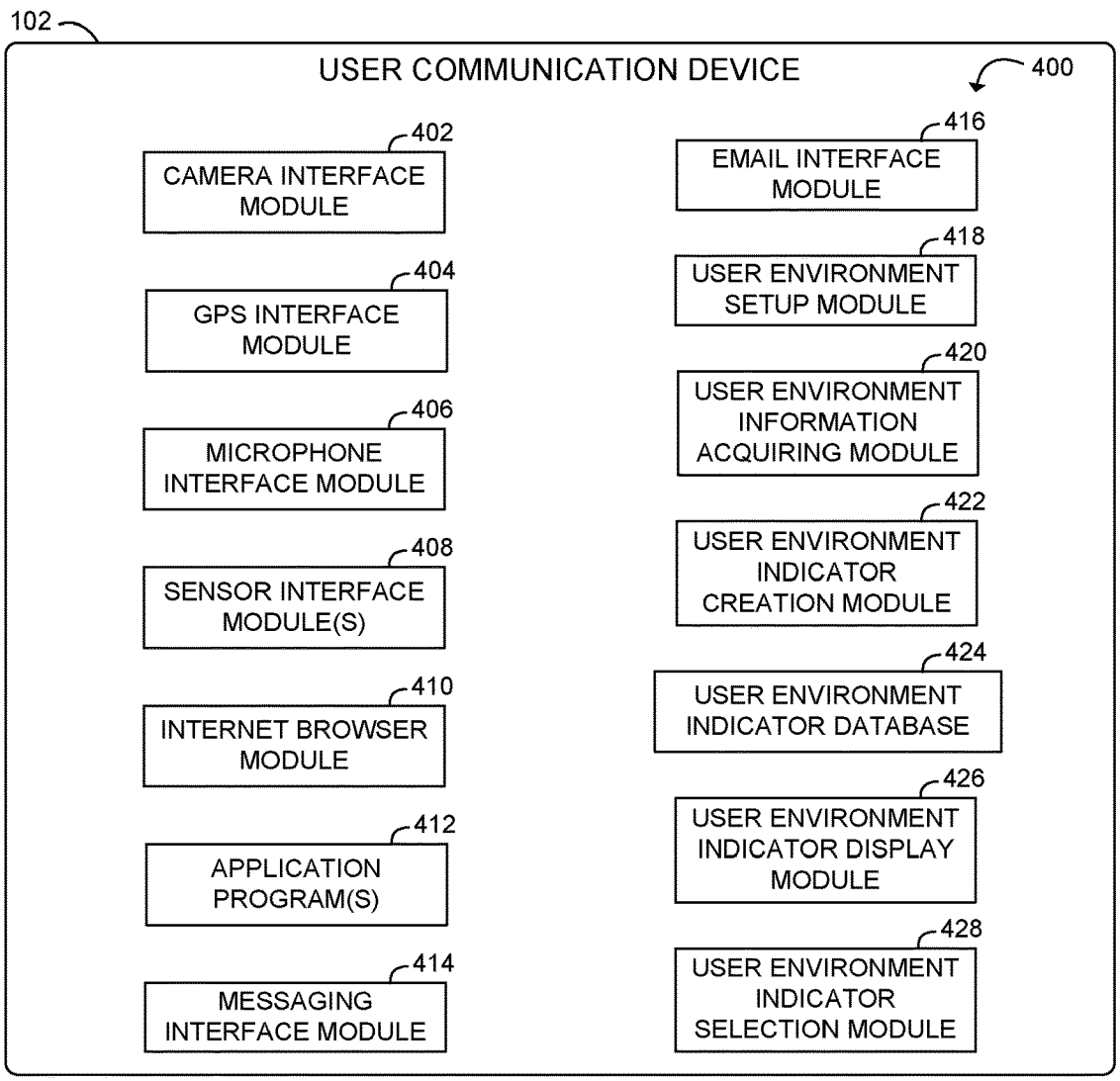
FIG. 4 is a simplified block diagram of at least one embodiment of an environment of the user communication device of FIGS. 1 and 2.

Referring now to FIG. 4, a simplified block diagram is shown of an embodiment of an environment 400 of the user communication device 102 illustrated in FIGS. 1 and 2. In the illustrated embodiment, the environment 400 includes a camera interface module 402, a GPS interface module 404, a microphone interface module 406, one or more sensor interface modules 408, e.g., one for each sensor on-board the user communication device 102, an internet browser module 410, one or more application programs 412, a messaging interface module 414 and an email interface module 416. The camera interface module 402 is configured, in a conventional manner to, process signals generated by the camera(s) 220 and produce corresponding still images and/or video images. The GPS interface module 404 is configured, in a conventional manner, to process signals received by the GPS receiver 222 to determine geographical coordinates corresponding to the physical location of the user communication device 102. The microphone interface module 406 is configured, in a conventional manner, to process signals generated by the microphone 224 in response to one or more detected sounds, and to produce a corresponding audio signal. The sensor interface module(s) 408 illustratively includes a separate sensor interface module for each sensor onboard the user communication device 102, and each such sensor interface module is configured, in a conventional manner, to process sensory signals generated by the corresponding sensor in response to that sensor's stimulus or stimuli, and produce a corresponding signal and/or determine a corresponding measure of the stimulus or stimuli. For example, in embodiments in which the user communication device 102 includes a magnometer, the corresponding magnometer interface module 408 is configured, in a conventional manner, to process signals generated by the magnometer and to determine a direction, relative to magnetic north, in which the user computing device is facing. It will be appreciated that the sensor interface module(s) 408 includes one or more sensor interface modules for each additional sensor onboard the user communication device 102, and that such one or more sensor interface modules is configured to process sensory signals produced by the corresponding sensor to produce one or more corresponding electronic signals and/or to determine some information corresponding to the sensory signals.

The internet browser module 410 is configured, in a conventional manner, to provide an interface for the perusal, presentation and retrieval of information by the user of the user communication device 102 of one or more information resources via the network 106, e.g., one or more websites hosted by one or more of the external computing devices/systems/servers $108_1$-$108_K$. The messaging interface module 414 is configured, in a conventional manner, to provide an interface for the exchange of messages between two or more remote users using a messaging service, e.g., a mobile messaging service (mms) implementing a so-called "instant messaging" or "texting" service, and/or a microblogging service which enables users to send text-based messages of a limited number of characters to wide audiences, e.g., so-called "tweeting." The email interface module 416 is configured, in a conventional manner, to provide an interface for composing, sending, receiving and reading electronic mail.

The application program(s) 412 may include any number of different software application programs, each configured to execute a specific task, and from which user environment information, i.e., information about the user of the user communication device 102 and/or about the environment surrounding the user communication device 102, may be determined or obtained. Any such application program may use information obtained from one or more onboard sensors 226, from the microphone 224, from the GPS receiver 222, from the camera 220, from one or more other application programs, from one or more of the user communication device modules, from one or more of the external sensors $110_1$-$110_L$ and/or from one or more of the external computing devices/systems/servers $108_1$-$108_K$ to determine or obtain the user environment information. As one example, a conventional weather application program illustratively utilizes GPS information produced by the GPS interface module 404 to determine the physical location of the device 102, then utilizes the internet browser module 410 to access weather information at or near the physical location of the device 102, and then displays the accessed weather information to the user via the display 212. It will be appreciated that other application programs 412 may be resident in the environment 400 of the user communication device 102, and that any such other application program 412 may be accessed to provide additional and/or different user environment information.

The environment 400 of the user communication device 102 illustrated in FIG. 4 further includes a user environment setup module 418, a user environment information acquiring module 420, a user environment indicator creation module 422, a user environment indicator database 424 in which user environment indicators created by the user environment indication creation module 422 are stored, a user environment indicator display module 426 and a user environment indicator selection module 428.

As will be described in detail below, the user communication device 102 is configured to automatically acquire, from one or more of the user environment information acquiring devices 218, from one or more of the external computing devices/systems/servers $108_1$-$108_K$ and/or from one or more of the external sensors $110_1$-$110_L$, user environment information relating to occurrences of stimulus events that are above a threshold level of change for any such stimulus event, to automatically create one or more user environment indicators based on the acquired user environment information and display such one or more user environment indicators via a user interface displayed on the display 212 of the user communication device 102 while the user of the user communication device 102 is in the process of communicating with one or more of the remote communication devices $104_1$-$104_J$ and/or one or more of the external computing devices/systems/servers $108_1$-$108_K$, e.g., via the internet browser module 410, the messaging interface module 414 and/or the email interface module 416. The communications being undertaken by the user of the user communication device 102 may be in the form of mobile or instant messaging, e-mail, blogging, microblogging, communicating via a social media service, communicating during or otherwise participating in on-line gaming, or the like. In any case, the user communication device 102 is further configured to allow the user to select one or more user environment indicators displayed via the user interface on the display 212, and to include the selected one or more user environment indicators in the communication to be transmitted by the user communication device 102.

In the above process, the user environment setup module 418 is configured, in one embodiment, to allow the user to set the level(s) of the stimulus threshold level(s) of one or more of the user environment information sources, although in other embodiments such stimulus threshold level(s) may be preset by or within the user communication device 102. Alternatively or additionally, the user environment setup module 418 may be configured to allow the user to define the number and/or type(s) of user environment indicators that may be automatically created by the user communication device 102 in response to stimulus events, although in other embodiments such number and/or type(s) of user environment indicators may be preset by the user communication device 102.

The user environment information acquiring module 420 is configured to acquire the user environment information defined by the user or by the user communication device 102, when and as the stimulus event or events corresponding to the user environment information reaches or exceeds a threshold level for the stimulus. For example, a threshold level for capture of the user's image by the camera 220 may be defined by a threshold change in the user's expression, e.g., smile, frown, laughter, closed eyes for a predefined period of time, eyes open wider than usual, a threshold change in the user's color, e.g., face reddened from laughter, a threshold change in the color, type, etc. of clothing, a threshold change movement, e.g., due to wind, of the user's hair, a threshold change in the style of the user's hair, etc. As another example, a threshold level for capture of audio information by the microphone 224 may be defined by a threshold level of sound that is detectable by the microphone 224, a signal-to-noise ratio of the sound, etc. In any case, it will be understood that the threshold levels for some user environment information may be achieved or exceeded instantaneously and frequently during communications by the user of the user communication device 102 with a remote person or persons, e.g., changes in facial expressions, and that the threshold levels for other user environment information may be achieved or exceeded less frequently, e.g., every several hours, overnight or several days or weeks, such as in the case of changes of clothing, changes in hair styles, changes in the weather, etc.

The user environment indicator creation module 422 is configured to create one or more user environment indicators based on the acquired user environment information. The user environment indicator may illustratively be created in the form of a still image, e.g. a still image avatar of the user and/or others and/or one or more other still images, an animation, e.g., an animated avatar of the user and/or others and/or one or more animated images, one or more audio files and/or one or more video files. In one embodiment, for example, a basic avatar template of the user may have multiple sections, e.g., 6 different sections, which map to corresponding sections of the user's face. When the user's facial expression changes sufficiently to cause the user's image to be acquired by the user environment information acquiring module 420, the module 422 may select a corresponding avatar in a library of avatars that matches the new facial expression, or the module 422 may otherwise adjust the avatar template to reflect or mimic the corresponding change in the user's facial expression. As another example, a dog barking in the vicinity of the user communication device 102 may be a recognized stimulus event, and in one embodiment the module 422 may respond to this stimulus by creating a user environment indicator in the form of a still avatar of a dog, e.g., by selecting from one or more dog avatars in a library of avatars. Alternatively or additionally, the module 422 may respond to the dog bark stimulus by creating an animated avatar of a dog barking. Alternatively or additionally, the module 422 may respond to detection of the dog bark by creating an audio file. The audio file may be a recording of the dog bark made by the user communication device 102 in response to detection of the dog bark stimulus, a pre-recorded dog bark and/or a synthesized dog bark. In the latter two cases, the module 422 is configured to correlate the audio signal or signals making up the audio file to a source of the captured sound or sounds. For example, the module 422 may have, or have access to, one or more conventional pattern recognition applications or the like which operate to identify likely sources of captured sounds and then create and/or recall from memory one or more corresponding audio signals and/or audio files. In any case, the dog bark may be provided alone or may be combined or otherwise included with the still or animated avatar of the dog. As yet another example, motions detected by a motion sensor 226, e.g., an accelerometer, may be combined with an avatar of a user to simulate movements made by the user of the user communication device 102. For example, the module 422 may respond to detection of spinning of the user communication device 102 to create a spinning animated avatar of the user to mimic actual spinning of the user.

As other examples, the module 422 may use GPS information to create a user environment indicator in the form of a map or image of a recognizable feature of a location, e.g., the Eiffel Tower in Paris, showing the user's location. Such a map or image may further be combined with an avatar of the user to produce a user environment indicator depicting the user superimposed on the map or image. The module 422 may also create avatars of others proximate to or in the vicinity of the user based on GPS positions of such others and/or on photographic information provided by one or more cameras that is/are not onboard the user communication device 102. The module 422 may also modify an avatar of the user based on sensory information detected by a sensor 226 that produces sensory information about the user, e.g., a heart rate sensor, such that the avatar could depict a startled response, a winded condition of the user, a sedentary condition of the user, etc. Audio information may additionally or alternatively be used for this purpose, and/or could be used to create an image of the user engaged in an activity, e.g., cooking, or at a recognizable location, e.g., a coffee shop. The module 422 could also use information from one or more cameras not onboard the device 102, e.g., a surveillance camera, to create a dual avatar of two users standing next to each other, or a multiple avatar of several people grouped together, and the dual avatar or multiple avatar could appear on user communication devices 102 of each such person to depict that they are together when communicating with each other.

Figure 5:
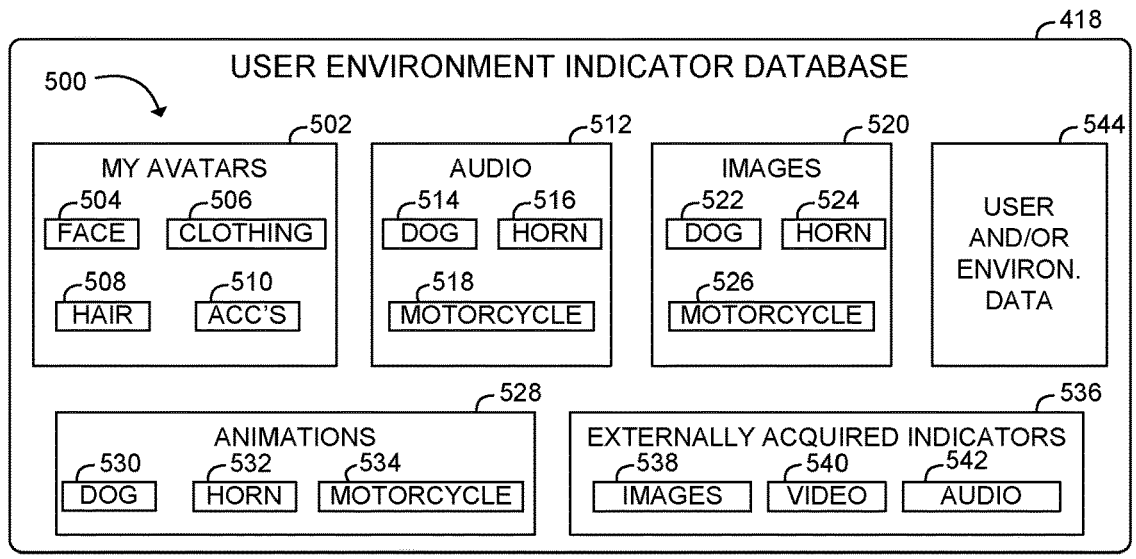
FIG. 5 is a simplified block diagram of at least one example implementation of the user environment indicator database of FIG. 4.

After the user environment indicator creation module 422 creates the user environment indicator, e.g., by modifying an existing user environment indicator or indicator template, or by creating a wholly new indicator, the module 422 stores the created user environment indicator in the user environment indicator database 424, e.g., located the data storage 206 and/or memory 202. Referring now to FIG. 5, a simplified block diagram is shown of an embodiment of an environment 500 of the user environment indicator database 424. In the embodiment illustrated in FIG. 5, an example file organization is shown and example user environment indicators are shown in each separate file. For example, the example file organization structure includes a file 502 having one or more avatars of the user stored therein, a file 512 having one or more audio files stored therein, a file 520 having one or more avatar and/or non-avatar images stored therein, a file 528 having one or more animations stored therein, a file 536 having one or more externally acquired indicators stored therein and a file 544 having user and/or environmental data stored therein. Within the file 502 is stored one or more avatar images 504 of the user's face, one or more avatar images 506 of the user wearing different clothing, one or avatar images 508 of the user's hair, e.g., multiple avatar images showing different hair styles and/or different hair states (e.g., wind blowing) of the user, and one or more avatar images 510 of the user wearing different accessories, e.g., glasses, hats, jewelry, etc. Within the file 512 is stored one or more audio files 514 of dog barking sounds, one or more audio files 516 of one or more vehicle horn sounds and one or more audio files 518 of one or more motorcycle sounds. Within the file 520 is stored one or more image files 522 of one or more dog avatars, one or more image files 524 of one or more vehicle horn avatars, and one or more image files 526 of one or more motorcycle avatars. Within the file 528 is stored one or more animated image files 530 of one or more dogs barking, one or more animated image files 532 of one or more vehicle horns blowing or honking and one or more animated images files of one or more moving motorcycles. Within the files 536 is stored one or more images 538, one or more videos 540 and one or more audio files 542 that were acquired externally from the user communication device 102. Within the file 544 is data relating to the user and/or to the environment surrounding the user. The data stored within the file 544 may be one or any combination of text, image, animation, audio and/or video.

The user environment indicator display module 426 is configured to control the display 212 to display the one or more created user environment indicators. In one embodiment, for example, a portion of the display area of the display 212, e.g., a user environment indicator display area, may be controlled to directly display only one or more newly created user environment indicators. Alternatively or additionally, the user environment indicator display area may be controlled to directly display one or more newly created and previously created user environment indicators. In either case, the user environment indicator display area of the display 212 may be located in a single area of the display 212, e.g., horizontally across and/or vertically up or down the display 212 such as in the form of a ticker graphic, or in a single block area of the display 212, or may alternatively be located in multiple areas of the display 212.

The user environment indicator selection module 428 is configured to include a selected one or ones of the one or more displayed user environment indicators in a communication to be transmitted by the user communication device 102. In embodiments in which the display 212 is a touch-screen display, for example, the user communication device 102 may monitor the user environment indicator display area of the display 212 for detection of contact with the display 212 in the areas of the one or more displayed user environment indicators(s), and in such embodiments the module 428 may be configured to be responsive to detection of such contact with any user environment indicator to automatically add that user environment indicator to the communication, e.g., message, to be transmitted by the user communication device. Alternatively, the module 428 may be configured to add the contacted user environment indicator to the communication to be transmitted by the user communication device 102 when the user drags, i.e., moves, the contacted user environment indicator to the message portion of the communication. In embodiments in which the display 212 is not a touch-screen and/or in which the user communication device includes another peripheral device which may be used to select displayed items, the module 428 may be configured to monitor such a peripheral device for selection of one or more of the displayed user environment indicator(s). It will be appreciated that other mechanisms and techniques are known which operate to automatically or under the control of a user duplicate, move or otherwise include a selected graphic displayed on one portion of a display at or to another portion of the display, and any such other mechanisms and/or techniques may be implemented in the user environment indicator selection module 428 to effectuate inclusion of one or more displayed user environment indicators in or with a communication to be transmitted by the user communication device 102.

Figure 6:
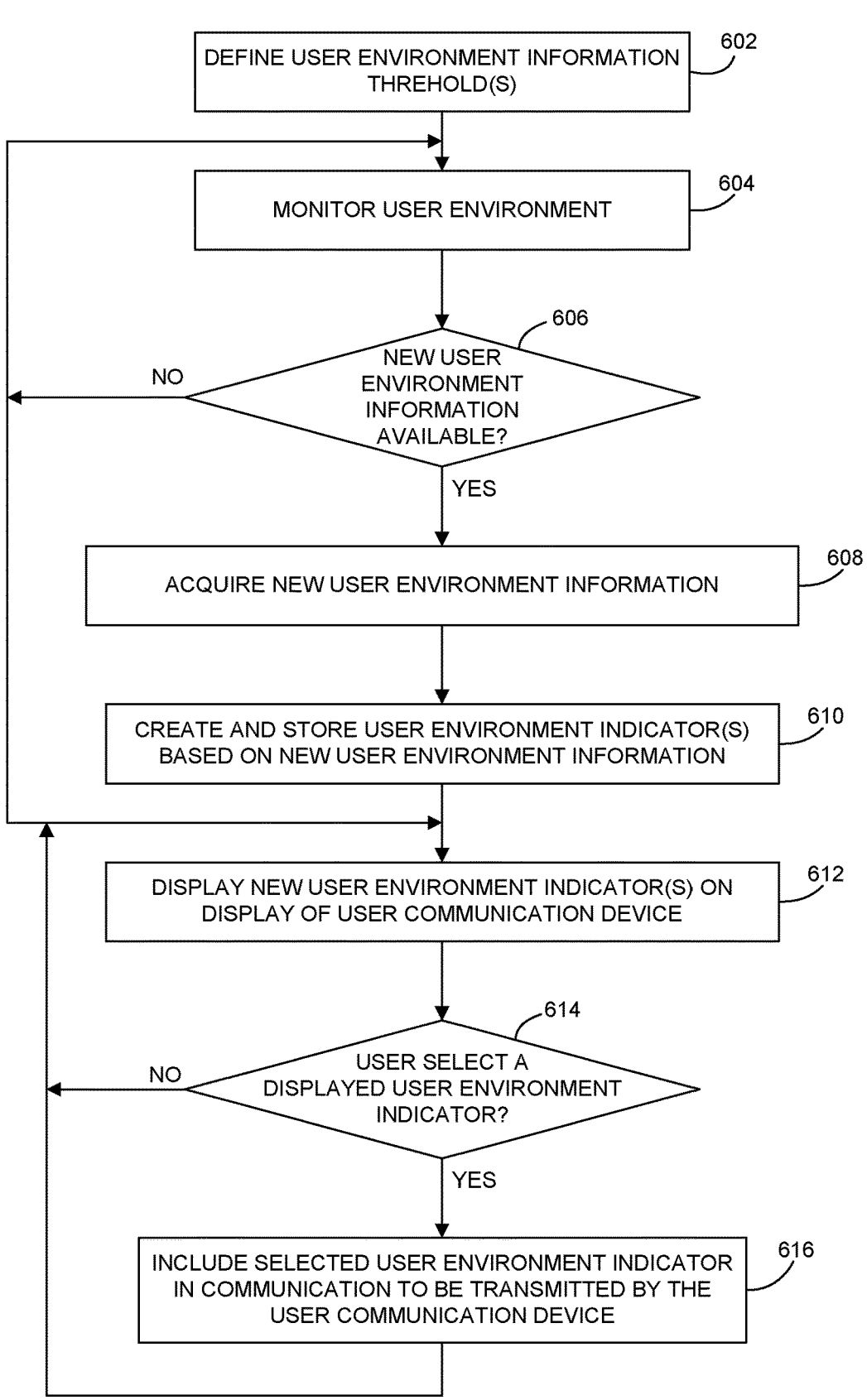
FIG. 6 is a simplified flow diagram of at least one embodiment of a method for selectively augmenting communications transmitted by the user communication device of FIGS. 1-2 and 4-5.

Referring now to FIG. 6, a simplified flow diagram is shown of an embodiment of a method 600 for selectively augmenting communications transmitted by the user communication device 102. In one embodiment, the method 600 is stored in the memory 202 and/or data storage 206 of the user communication device 102 in the form of one or more sets of instructions executable by the processor 200 to carry out the functionality of the method 600. Alternatively, the method 600 may be executed, in whole or in part, by a processor remote from the processor 200 and from the user communication device 102, wherein the results of such processing may be shared with the user communication device 102, e.g., via the network 106. For purposes only of the following description, however, the method 600 will be described as being executed by the user communication device 102 (e.g., by processor 200). In the illustrated embodiment, the method 600 begins at block 602 wherein the user environment information threshold(s) is/are defined. As described above, the threshold(s) represent one or more threshold levels, e.g., change threshold levels, at or above which the user communication device 102 automatically acquires user environment information. In one embodiment, one or more of the user environment information thresholds(s) is/are preset or otherwise set by the user communication device 102. In some alternative embodiments, one or more of the user environment information threshold(s) is/are defined by the user, e.g., via suitable calibration program. In some embodiments, the user communication device 102 is further operable at block 602 to allow the user to define the number and/or type(s) of user environment indicators that may be created and/or the number and/or type(s) of user environment information that may be acquired by the user communication device 102. In other embodiments, the number and/or type(s) of user environment indicators and the number and/or type(s) of user environment information that may be acquire are predetermined, e.g., pre-programmed.

The method 600 advances from block 602 to block 604 in which the user communication device 102 monitors the user environment, i.e., the user and/or the environment surrounding the user, for stimulus creating events. To do so, in one embodiment, the user communication device 102 monitors the various components capable of detecting or receiving stimulus information, e.g., by continually polling information detected or received by the various user environment information acquiring devices 218, the one or more external sensors $110_1$-$110_L$ and/or the one or more external devices/systems/servers $108_1$-$108_K$. Thereafter at block 606, the user communication device 102 determines whether any new user environment information is available. To do so, the user communication device 102 may compare the information detected and/or received by the various user environment information acquiring devices 218, the one or more external sensors $110_1$-$110_L$ and/or the one or more external devices/systems/servers $108_1$-$108_K$ to their corresponding stimulus threshold levels. If information detected and/or received by any of the user environment information acquiring devices 218, the one or more external sensors $110_1$-$110_L$ and/or the one or more external devices/systems/servers $108_1$-$108_K$ meets or exceeds a corresponding stimulus threshold, new user environment information is deemed available, and the method 600 advances to block 608 where the user communication device 102 acquires the new user environment information, e.g., the user communication device 102 stores the new user environment information in memory 202 and/or the data storage 206, and otherwise the method 600 loops back to block 604 (and also loops forward to block 612).

Following block 608, the method 600 advances to block 610 in which the user communication device 102 creates one or more user environment indicators, e.g., one or more avatars, one or more images, one or more animations, one or more audio files, and/or one or more video files, based on the new user environment information acquired at block 608, and stores the one or more created user environment indicators in the user environment indicator database 424.

Following block 610, the method 600 advances to block 612 in which the user communication device 102 displays the newly created user environment indicator(s) on the display 212 of the user communication device 102. Thereafter at block 614, the user communication device 102 monitors the displayed user environment indicator(s) to determine whether the user has selected one of the displayed user environment indicator(s). In embodiments in which the display 212 is a touch-screen display, the user communication device 102 may monitor the display 212 for detection of contact with the display in the areas of the one or more displayed user environment indicators(s). In embodiments in which the display 212 is not a touch-screen and/or in which the user communication device includes another peripheral device which may be used to select displayed items, the user communication device 102 may monitor such a peripheral device for selection of one or more of the displayed user environment indicator(s). In any case, if the user communication device 102 determines at block 614 that the user has selected a displayed user environment indicator, the method 600 advances to block 616 in which the user communication device 102 includes the selected user environment indicator in the communication to be transmitted by the user communication device 102, and otherwise the method 600 loops back to blocks 604 and 612. Following execution of block 616, the method 600 likewise loops back to blocks 604 and 612.

Figure 7:
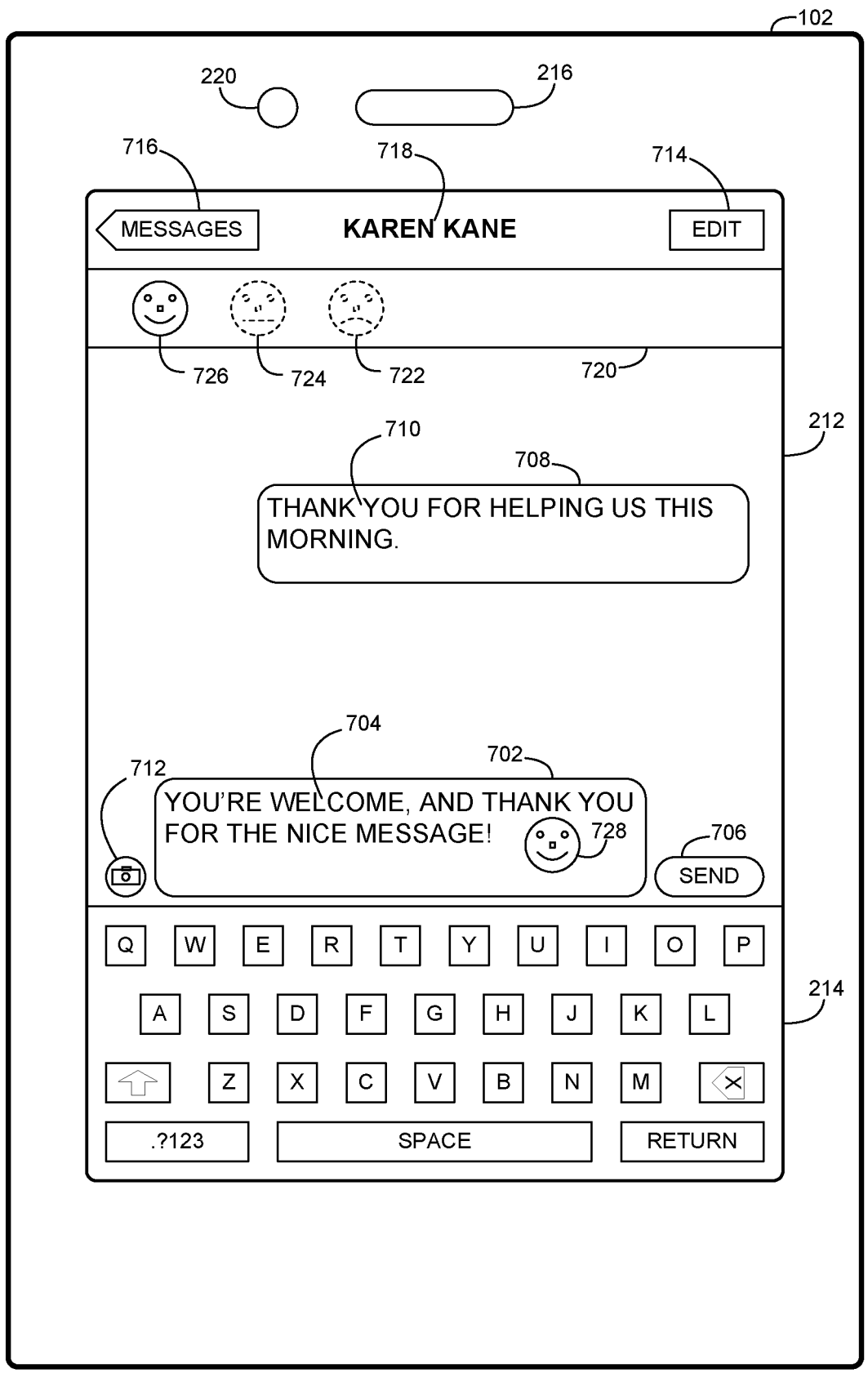
FIG. 7 is a simplified diagram illustrating an embodiment of the user communication device engaged in an example communication in which the user has selected from the display a recently acquired user avatar for inclusion with the communication to be transmitted by the device.

In one embodiment, the user communication device 102 performs block 612 by controlling a user environment indicator display area of the display 212 to directly display only one or more newly created user environment indicators. Alternatively, the user communication device 102 may perform block 612 by controlling the display 212 to directly display in the user environment indicator display area one or more newly created and previously created user environment indicators. This latter embodiment is illustrated in FIG. 7 in which a user communication device 102 is shown in the form of a mobile communication device, e.g., a smart phone. In the embodiment illustrated in FIG. 7, the display 212 includes the keypad 214, although in other embodiments the communication device 102 may include a physical keypad. In any case, the user communication device 102 depicted in FIG. 7 further includes a speaker 216 and a front-facing camera 220.

The user communication device 102 illustrated in FIG. 7 is executing a mobile messaging service (mms) or short messaging service (sms) application in which the user communication device 102 controls the display 212 to depict a current message content window 702, a "SEND" graphic 706, a previous message content window 708, a camera graphic 712, an "EDIT" graphic, a "MESSAGES" graphic 716 and the name of a remote message recipient/transmitter 718. The user of the user communication device 102 has previously received a message 710 from the remote message recipient/transmitter 718, and the user is responding with a message 704 to transmit back to the remote message recipient/transmitter.

In accordance with the method 600 illustrated in FIG. 6, the user communication device 102 has controlled the display 212 of the user communication device 102 to include a user environment indicator display area 720. Within the user environment indicator display area 720, the user communication device 102 has, in accordance with block 612 of the method 600, controlled the display 212 to include in the user environment indicator display area 720 a number of newly and previously created user environment indicators in the form of still-image avatars 722, 724 and 726 of the user's face. It will be appreciated that while the avatars 722, 724 and 726 are intended to represent avatars of an actual user's face, the avatars 722, 724 and 726 depicted in FIG. 7 have been greatly simplified for ease of illustration. In any case, the avatars 722 and 724 are shown in dashed-line form to indicate that they are not the most recently created avatars of the user's face, whereas the avatar 726 is shown in solid-line form to indicate that this avatar represents the current expression on the user's face. While the user could have selected any of the displayed avatars 722, 724, 726 to include with the message 704, or could have chosen not to include any of the avatars 722, 724, 726 with the message 704, the user selected the avatar 726 to include in the communication to be transmitted by the user communication device 102. The user communication device 102 was responsive to selection by the user of the avatar 726 to reproduce a copy 728 of the avatar in the message window 702 adjacent to the message 704. The smile on the avatar's face 728 allows the user to provide non-textual feedback to the remote message recipient/transmitter, when the user selects the SEND graphic 706, that the message 710 sent by the remote message recipient/transmitter made the user smile.

Figure 8:
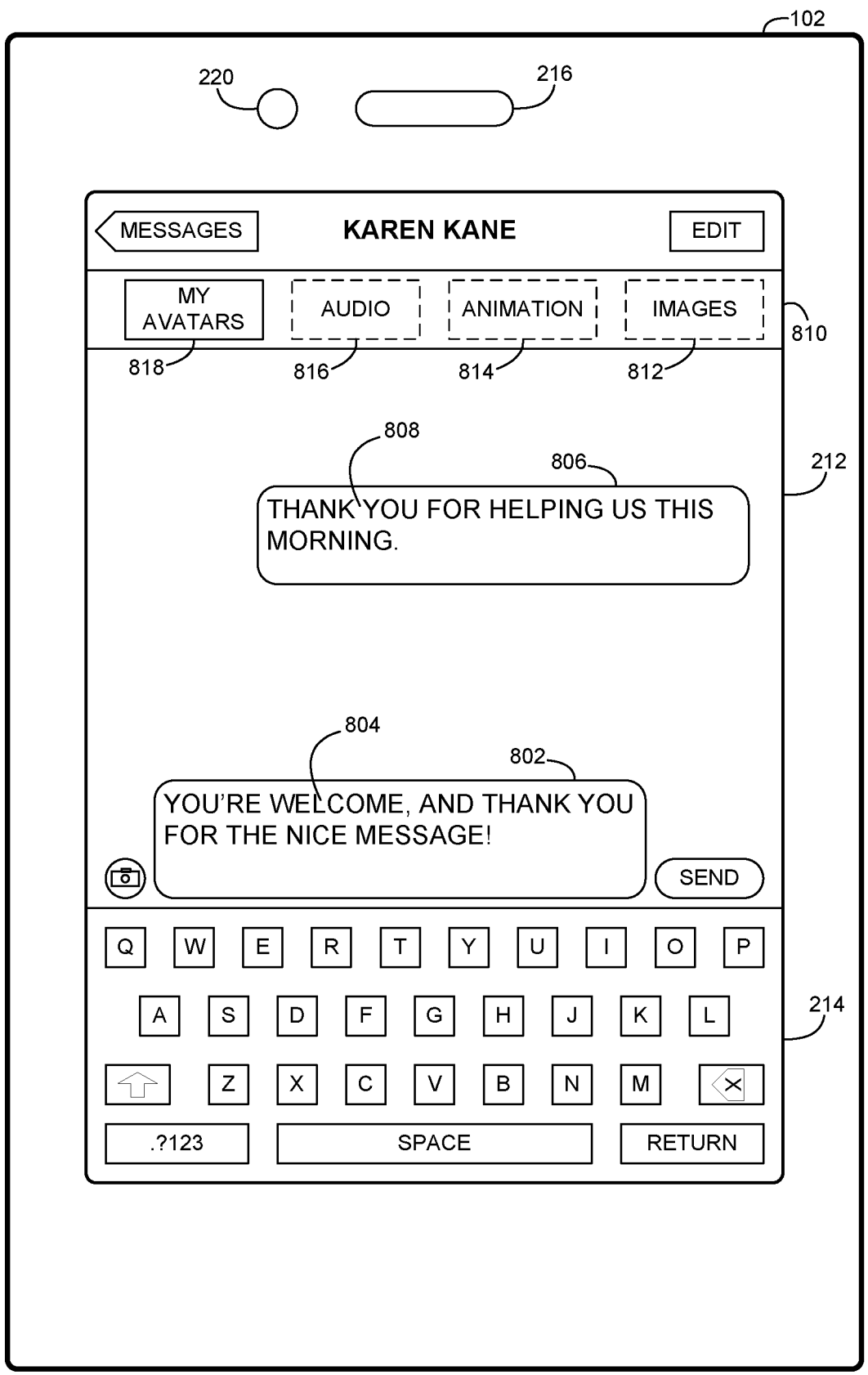
FIGS. 8 and 9 are simplified diagrams illustrating an embodiment of the user communication device engaged in another example communication in which the user has selected from a displayed library of user avatars a recently acquired user avatar for inclusion with the communication to be transmitted by the device.
Figure 9:
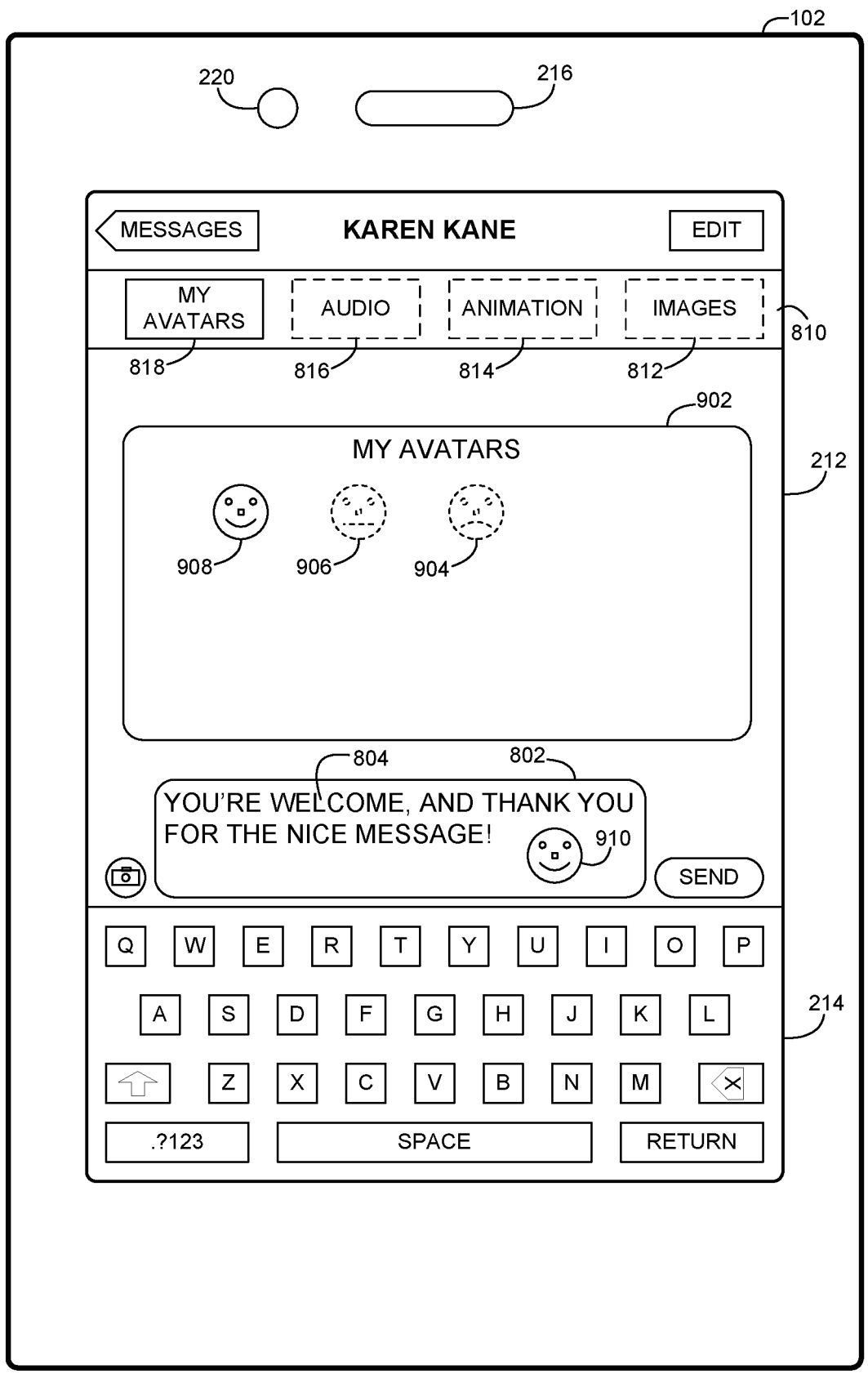

In another embodiment, the user communication device 102 performs block 612 by controlling the user environment indicator display area of the display 212 to indirectly display user environment indicators by directly displaying selectable graphic images of user environment indicator categories. An example of this embodiment is illustrated in FIGS. 8 and 9 in which the user communication device 102 is as depicted in FIG. 7, and has controlled the display 212 to depict a current message content window 802 including the same current message 804 illustrated in FIG. 7, a previous message content window 806 including the same previous message 808 illustrated in FIG. 7, a user environment indicator display area 810. Within the user environment indicator display area 810, the user communication device 102 has, in accordance with the present embodiment of block 612 of the method 600, controlled the display 212 to include in the user environment indicator display area 810 a number of user environment indicator category graphics 812, 814, 816 and 818. The IMAGES, ANIMATION and AUIDO graphics 812, 814 and 816 are illustrated in dashed-line form to represent that no non-avatar images, animations or audio files have been recently created, whereas the MY AVATARS graphic is illustrated in solid-line form to represent that the MY AVATARS category includes one or more newly created user avatars. While the user could select any of the graphics 812, 814, 816 or 818 to include one or more corresponding user environment indicators from the selected category of user environment indicators, or choose not to select any of the graphics 812, 814, 816 or 818, the user selects the MY AVATARS graphic 818, the result of which is illustrated in FIG. 9. As shown in FIG. 9, the user communication device 102 has controlled the display 212 to replace the previous message window 808, or to overlay on the previous message window 808, a window 902 depicting the contents of the MY AVATARS file or library stored in the user environment indicator database 424 which contains three still-image avatars 904, 906 and 908 of the user's face. While the user could have selected any of the displayed avatars 904, 906, 908 to include with the message 804, or could have chosen not to include any of the avatars 904, 906, 908 with the message 804, the user selected the avatar 908 to include in the communication to be transmitted by the user communication device 102. The user communication device 102 was responsive to selection by the user of the avatar 908 to reproduce a copy 910 of the avatar in the message window 802 adjacent to the message 804. Again, the smile on the avatar's face 910 allows the user to provide non-textual feedback to the remote message recipient/transmitter that the message 808 sent by the remote message recipient/transmitter made the user smile.

Figure 10:
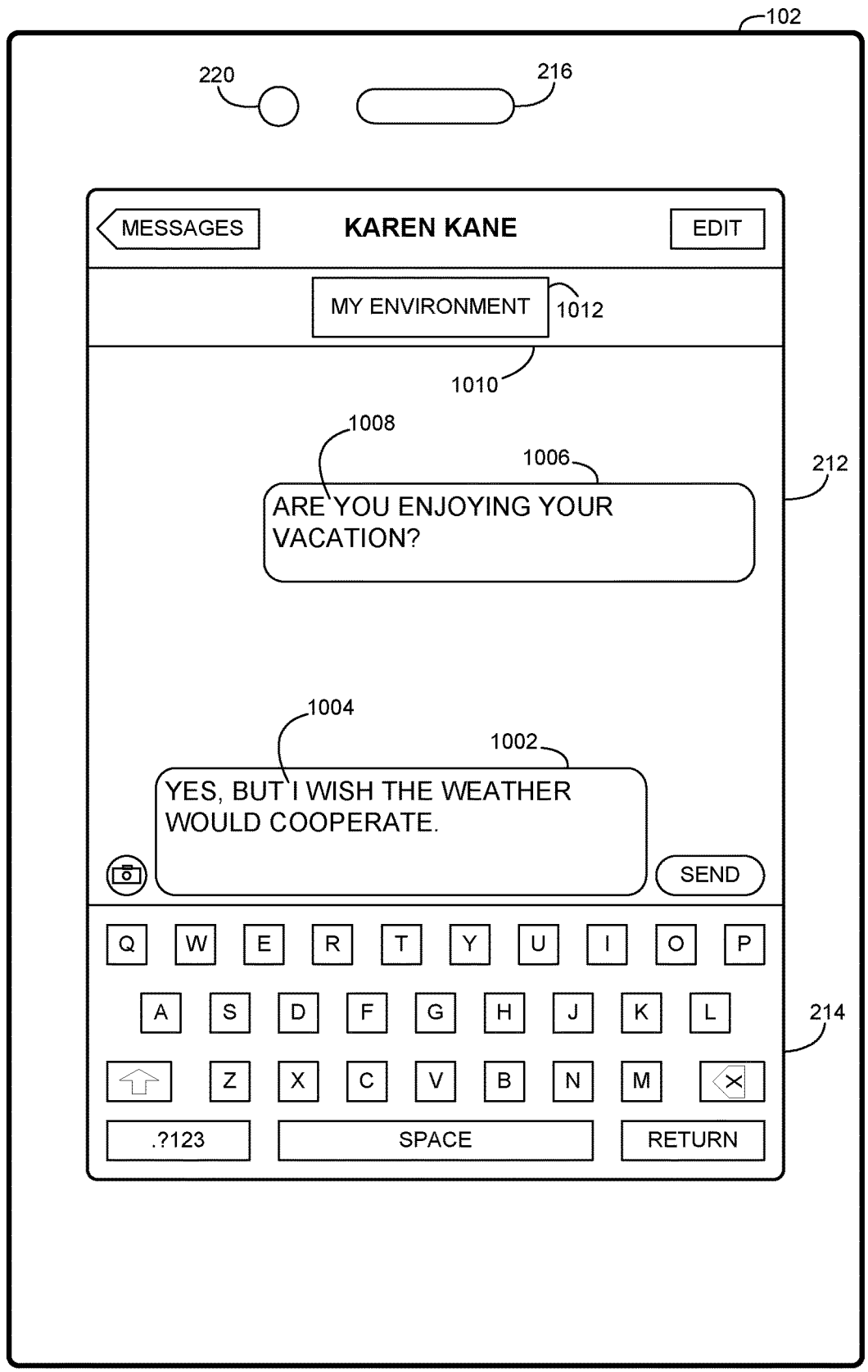
FIGS. 10 and 11 are simplified diagrams illustrating an embodiment of the user communication device engaged in yet another example communication in which the user has selected from a displayed library of user environment indicators a recently acquired user avatar, a current local weather indicator and an accompanying audio file for inclusion with the communication to be transmitted by the device.
Figure 11:
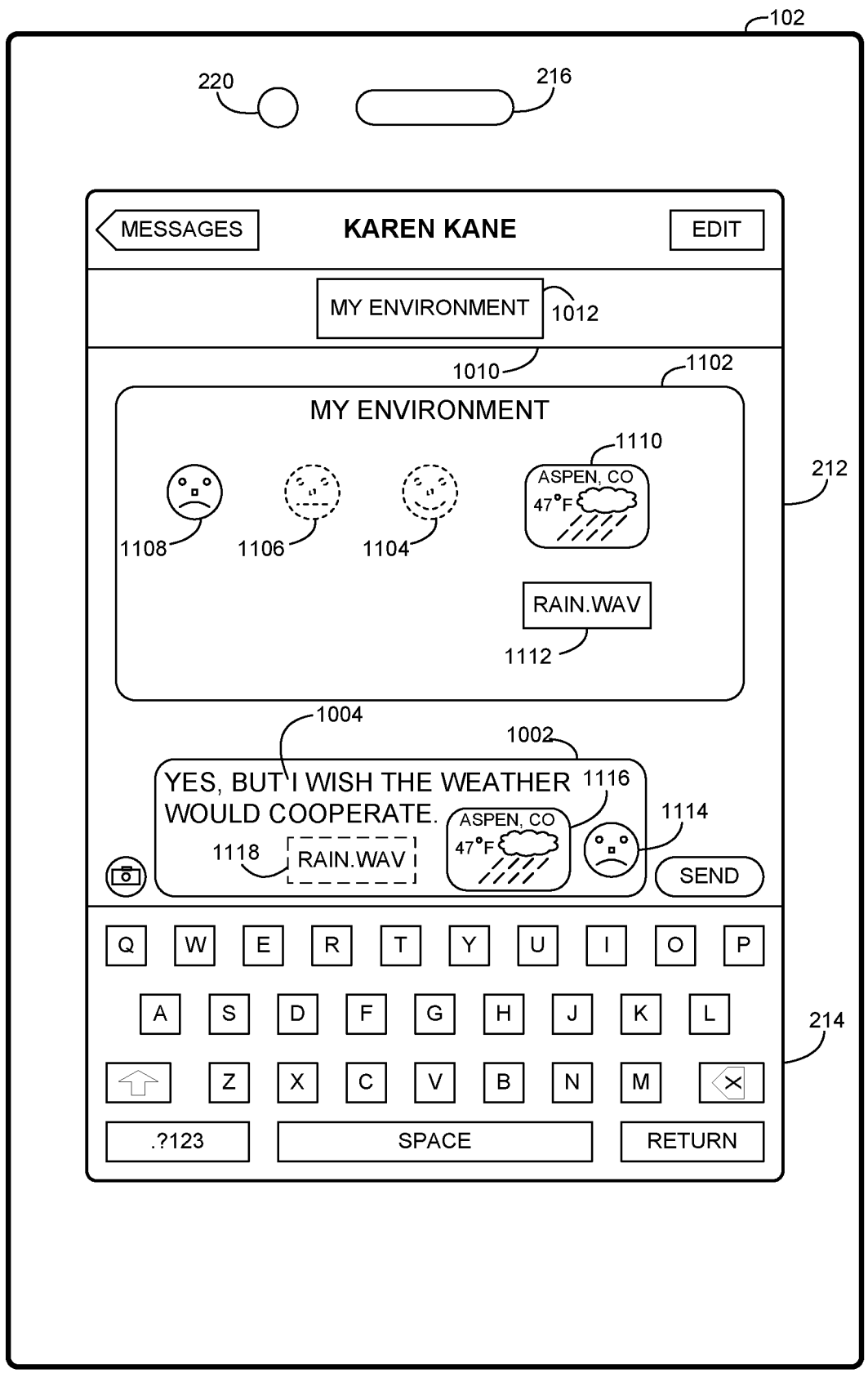

In yet another embodiment, the user communication device 102 performs block 612 by controlling the user environment indicator display area of the display 212 to indirectly display user environment indicators by directly displaying a single selectable graphic image of a library of user environment indicators. An example of this embodiment is illustrated in FIGS. 10 and 11 in which the user communication device 102 is as depicted in FIG. 7, and has controlled the display 212 to depict a current message content window 1002 including a current message 1004 entered by the user of the user communication device 102 in response to a message 1008 transmitted by the remote message recipient/transmitter and depicted in a previous message content window 1006, and a user environment indicator display area 810. Within the user environment indicator display area 810, the user communication device 102 has, in accordance with the present embodiment of block 612 of the method 600, controlled the display 212 to include in the user environment indicator display area 810 a single graphic 1012 depicting a selectable library of user environment indicators. The MY ENVIRONMENT graphic 1012 is illustrated in solid-line form to represent that the library includes one or more newly created user environment indicators. While the user could choose not to select the graphic 1012 and thereby not include any user environment indicators with the message 1004, the user selects the MY ENVIRONMENT graphic 1012, the result of which is illustrated in FIG. 11.

As shown in FIG. 11, the user communication device 102 has controlled the display 212 to replace the previous message window 1008, or to overlay on the previous message window 1008, a window 1102 depicting the contents of the MY ENVIRONMENT file or library 1102 stored in the user environment indicator database 424. The MY ENVIRONMENT library 1102 illustrated in FIG. 11 illustratively contains three still-image avatars 1104, 1106 and 1108 of the user's face, an image of the current weather conditions at the location of the user communication device 102 and an audio file 1112 of rain sounds, e.g., the sound of a rain storm. The avatars 1104 and 1106 are shown in dashed-line form to indicate that they are not the most recently created avatars of the user's face, whereas the avatar 1108 is shown in solid-line form to indicate that this avatar represents the current expression on the user's face. Likewise, the image 1110 of the current weather conditions at the location of the user communication device 102 and the audio rain file 1112 are shown in solid-line form to indicate that these are newly created user environment indicators. While the user could have selected any of the displayed avatars 1104, 1106, 1108 to include with the message 1004, or could have chosen not to include any of the avatars 1104, 1106, 1108, the image 1110 or the audio rain file 1112 with the message 804, the user selected the avatar 1108, the weather image 1110 and the audio rain file 1112 to include in the communication to be transmitted by the user communication device 102. The user communication device 102 was responsive to selection by the user of the avatar 1108 to reproduce a copy 1114 of the avatar in the message window 1002 adjacent to the message 1004, to selection by the user of the weather image 1110 to reproduce a copy 1116 of this image in the message window 1002 adjacent to the message 1004 and to selection by the user of the audio rain file 1112 to reproduce a copy 1118 of this image in the message window 1002 adjacent to the message 1004. In response to the message 1008 sent by the remote message recipient/transmitter inquiring about the user's vacation experience, the frown on the avatar's face 1114, the image 1116 depicting rain and 47 degrees at the user's location and the audio rain file 1118 allows the user to provide non-textual feedback to the remote message recipient/transmitter user is displeased with the current weather conditions.

EXAMPLES

Illustrative examples of the devices, systems, and methods disclosed herein are provided below. An embodiment of the devices, systems, and methods may include any one or more, and any combination of, the examples described below.

Example 1 includes a communication device for selectively augmenting communications. The communication device includes a display, a user environment information acquiring module to acquire user environment information relating to an environment of a user of the communication device, a user environment indicator creation module to create one or more user environment indicators based on acquired user environment information, a user environment indicator display module to display the one or more created user environment indicators via the display, and a user environment indicator selection module to include a selected one or ones of the one or more displayed user environment indicators in a communication to be transmitted by the communication device.

Example 2 includes the subject matter of Example 1, and further includes a user environment acquiring device to produce the user environment information.

Example 3 includes the subject matter of Examples 1 or 2, and wherein the user environment acquiring device comprises at least one of a camera, a global positioning system receiver, a microphone and at least one sensor to produce a sensor signal corresponding to one of the user and the environment of the user.

Example 4 includes the subject matter of Examples 1-3, and further including a processor and at least one application program executed by the processor to produce the user environment information.

Example 5 includes the subject matter of Examples 1-4, and further including a processor and an internet browser executed by the processor to receive the user environment information via the internet.

Example 6 includes the subject matter of Examples 1-5, and wherein the user environment acquiring module to acquire the user environment information when the user environment information changes by at least a threshold amount.

Example 7 includes the subject matter of Examples 1-6, and further include a memory and wherein the user environment information creation module to store the one or more user environment indicators in the memory.

Example 8 includes the subject matter of Examples 1-7, and wherein the user environment indicator creation module to create the one or more user environment indicators in the form of one or more of (i) an image, (ii) an animation, (iii) an audio file, (iv) a video file, and (v) a network link to an image, animation, audio file, or video file.

Example 9 includes the subject matter of Examples 1-8, and wherein the user environment information comprises a captured image of the user produced by the camera, and wherein the user environment indicator creation module to create at least one of the one or more user environment indicators in the form of an image avatar of the user based on the captured image of the user.

Example 10 includes the subject matter of Examples 1-9, and wherein the user environment acquiring module to monitor the user via the camera and capture the image of the user when at least one attribute of the user changes by at least a threshold amount, the at least one attribute being at least one of a facial feature of the user, clothing worn by the user, an accessory worn by the user and a position of the user' hair.

Example 11 includes the subject matter of Examples 1-10, and wherein the user environment information comprises a captured image of the user produced by the camera and sensory data relating to the user produced by at least one of the sensors, and wherein the user environment indicator creation module to create at least one of the one or more user environment indicators in the form of an animation avatar of the user based on the captured image of the user and on the sensory data.

Example 12 includes the subject matter of Examples 1-11, and wherein the at least one sensor comprises a motion sensor, and wherein the sensory data relating to the user corresponds to movement of the user.

Example 13 includes the subject matter of Examples 1-12, and wherein the user environment information comprises an audio signal produced by the microphone, the audio signal corresponding to one or more sounds detected by the microphone, and wherein the user environment indicator creation module to create at least one of the one or more user environment indicators in the form of an audio file based on at least one of the audio signal and a previously stored audio file.

Example 14 includes the subject matter of Examples 1-13, and wherein the user environment indicator creation module to correlate the audio signal to a source of the one or more sounds and to create at least one of the one or more user environment indicators in the form of an image or animation avatar of the source of the one or more sounds along with the audio file.

Example 15 includes the subject matter of Examples 1-14, and wherein the user environment acquiring module to acquire the audio signal when an intensity of the one or more sounds detected by the microphone exceeds a sound intensity level threshold.

Example 16 includes the subject matter of Examples 1-15, and wherein the user environment indicator display module to one of directly display the one or more created user environment indicators on the display and display a selectable library of user environment indicators, wherein the selectable library includes the one or more created user environment indicators.

Example 17 includes a method for selectively augmenting communications transmitted by a communication device. The method includes acquiring new user environment information relating to an environment of a user of the communication device, creating a user environment indicator based on the new user environment information, displaying the created user environment indicator via a display of the communication device, and including the created user environment indicator in a communication to be transmitted by the communication device.

Example 18 includes the subject matter of Example 17, and wherein acquiring the new user environment information comprises acquiring new information relating to at least one of the user of the communication device and the environment of the communication device using at least one of a camera, a global positioning system receiver, a microphone and at least one sensor to produce a sensor signal corresponding to one of the user and the environment of the user.

Example 19 includes the subject matter of Examples 17 or 18, and wherein acquiring the new user environment information comprises acquiring information produced by at least one application program executed by a processor of the communication device.

Example 20 includes the subject matter of Examples 17-19, and wherein acquiring the new user environment information comprises acquiring the new user environment information via the internet using an internet browser executed by a processor of the communication device.

Example 21 includes the subject matter of Examples 17-20, and wherein acquiring the new user environment information comprises acquiring the new user environment information only when the user environment information changes by at least a threshold amount.

Example 22 includes the subject matter of Examples 17-21, and further including storing the user environment indicator in a memory of the communication device.

Example 23 includes the subject matter of Examples 17-22, and wherein creating the user environment indicator comprises creating the user environment indicator in the form of one or more of an image, an animation, an audio file and a video file.

Example 24 includes the subject matter of Examples 17-23, and wherein acquiring the new user environment information comprises acquiring the new user environment information in the form of an image of the user of the communication device captured by the camera, and wherein creating the user environment indicator comprises creating the user environment indicator in the form of an image avatar of the user based on the image of the user captured by the camera.

Example 25 includes the subject matter of Examples 17-24, and wherein creating the user environment indicator comprises creating the user environment indicator in the form of an image avatar of one or more individuals other than the user.

Example 26 includes the subject matter of Examples 17-25, and wherein acquiring the image of the user captured by the camera comprises capturing the image of the user when at least one attribute of the user changes by at least a threshold amount, the at least one attribute being at least one of a facial feature of the user, clothing worn by the user, an accessory worn by the user and a position of the user' hair.

Example 27 includes the subject matter of Examples 17-26, and wherein acquiring the new user environment information comprises acquiring the new user environment information in the form of an image of the user captured by the camera and acquiring sensory data relating to the user produced by at least one of the sensors in the form of sensory data, and wherein creating the user environment indicator comprises creating an animation avatar of the user based on the image of the user captured by the user and on the sensory data produced by the at least one of the sensors.

Example 28 includes the subject matter of Examples 17-27, and wherein the sensory data relating to the user corresponds to movement of the user.

Example 29 includes the subject matter of Examples 17-28, and wherein acquiring the new user environment information comprises acquiring the new user environment information in the form of an audio signal corresponding to one or more sounds detected by the microphone, and wherein creating the user environment indicator comprises creating the user environment indicator in the form of an audio file based on at least one of the audio signal and a previously stored audio file.

Example 30 includes the subject matter of Examples 17-29, and wherein creating the user environment indicator comprises correlating the audio signal to a source of the one or more sounds, and creating the user environment indicator in the form of an image or animation avatar of the source of the one or more sounds along with the audio file.

Example 31 includes the subject matter of Examples 17-30, and wherein acquiring the new user environment information comprises acquiring the audio signal when an intensity of the one or more sounds detected by the microphone exceeds a sound intensity level threshold.

Example 32 includes the subject matter of Examples 17-31, and wherein displaying the user environment indicator via the display of the communication device comprises displaying the created user environment indicator by one of displaying the created user environment indicator on the display and displaying a selectable library of user environment indicators, wherein the selectable library includes the created user environment indicator.

Example 33 includes the subject matter of Examples 17-32, and further including determining whether new information relating to the environment of the user of the communication device is available, wherein acquiring the new user environment information comprises acquiring the new user environment information if the new information relating to the environment of the user is available.

Example 34 includes the subject matter of Examples 17-33, and further including determining whether the created user environment indicator is selected for inclusion in the communication, and wherein including the created user environment indicator in the communication comprises including the created user environment indicator in the communication if the created user environment indicator is selected for inclusion in the communication.

Example 34 includes one or more computer-readable storage media containing instructions for selectively augmenting communications transmitted by a communication device wherein execution of the instructions by one or more processors of a computing device causes the one or more processors to acquire new user environment information relating to an environment of a user of the communication device, create a user environment indicator based on the new user environment information, display the created user environment indicator via a display of the communication device, and include the created user environment indicator in a communication to be transmitted by the communication device.

Example 35 includes the subject matter of Example 34, and wherein execution of the instructions further causes the one or more processors to acquire the new user environment information by acquiring new information relating to at least one of the user of the communication device and the environment of the communication device using at least one of a camera, a global positioning system receiver, a microphone and at least one sensor to produce a sensor signal corresponding to one of the user and the environment of the user.

Example 36 includes the subject matter of Examples 34 and 35, and wherein execution of the instructions further causes the one or more processors to acquire the new user environment information by acquiring information produced by at least one application program executed by a processor of the communication device.

Example 37 includes the subject matter of Examples 34-36, and wherein execution of the instructions further causes the one or more processors to acquire the new user environment information via the internet using an internet browser executed by a processor of the communication device.

Example 38 includes the subject matter of Examples 34-37, and wherein execution of the instructions further causes the one or more processors to acquire the new user environment information by acquiring the new user environment information when the user environment information changes by at least a threshold amount.

Example 39 includes the subject matter of Examples 34-38, and wherein execution of the instructions further causes the one or more processors to store the user environment indicator in a memory of the communication device.

Example 40 includes the subject matter of Examples 34-39, and wherein execution of the instructions further causes the one or more processors to create the user environment indicator in the form of one or more of an image, an animation, an audio file and a video file.

Example 41 includes the subject matter of Examples 34-40, and wherein execution of the instructions further causes the one or more processors to acquire the new user environment information in the form of an image of the user captured by the camera, and wherein execution of the instructions further causes the one or more processors to create the user environment indicator in the form of an image avatar of the user based on the image of the user capture by the camera.

Example 42 includes the subject matter of Examples 34-41, and wherein execution of the instructions further causes the one or more processors to acquire the image of the user captured by the camera by capturing the image of the user when at least one attribute of the user changes by at least a threshold amount, the at least one attribute being at least one of a facial feature of the user, clothing worn by the user, an accessory worn by the user and a position of the user' hair.

Example 43 includes the subject matter of Examples 34-42, and wherein execution of the instructions further causes the one or more processors to acquire the new user environment information in the form of an image of the user captured by the camera and by acquiring sensory data relating to the user produced by at least one of the sensors in the form of sensory data, and wherein execution of the instructions further causes the one or more processors to create the user environment indicator by creating an animation avatar of the user based on the image of the user captured by the user and on the sensory data produced by the at least one of the sensors.

Example 44 includes the subject matter of Examples 34-43, and wherein the sensory data relating to the user corresponds to movement of the user.

Example 45 includes the subject matter of Examples 34-44, and wherein execution of the instructions further causes the one or more processors to acquire the new user environment information in the form of an audio signal corresponding to one or more sounds detected by the microphone, and wherein execution of the instructions further causes the one or more processors to create the user environment indicator in the form of an audio file based on at least one of the audio signal and a previously stored audio file.

Example 46 includes the subject matter of Examples 34-45, and wherein execution of the instructions further causes the one or more processors to create the user environment indicator by correlating the audio signal to a source of the one or more sounds, and creating the user environment indicator in the form of an image or animation avatar of the source of the one or more sounds along with the audio file.

Example 47 includes the subject matter of Examples 34-46, and wherein execution of the instructions further causes the one or more processors to acquire the new user environment information by acquiring the audio signal when an intensity of the one or more sounds detected by the microphone exceeds a sound intensity level threshold.

Example 48 includes the subject matter of Examples 34-47, and wherein execution of the instructions further causes the one or more processors to display the user environment indicator via the display of the communication device by one of displaying the created user environment indicator on the display and displaying a selectable library of user environment indicators, wherein the selectable library includes the created user environment indicator.

Example 49 includes the subject matter of Examples 34-48, and wherein execution of the instructions further causes the one or more processors to determine whether new information relating to the environment of the user of the communication device is available, and wherein execution of the instructions further causes the one or more processors to acquire the new user environment information if the new information relating to the environment of the user is available.

Example 50 includes the subject matter of Examples 34-49, and wherein execution of the instructions further causes the one or more processors to determine whether the created user environment indicator is selected for inclusion in the communication, and wherein execution of the instructions further causes the one or more processors to include the created user environment indicator in the communication if the created user environment indicator is selected for inclusion in the communication.

Example 51 includes computing device having a processor and a memory having stored therein a plurality of instructions that, in response to being executed by the processor, results in the processor performing the method of any of claims 17-34.

Example 52, includes one or more machine-readable storage media comprising a plurality of instructions stored thereon that in response to being executed by a computing device results in performing any of claims 17-34.

The invention claimed is:

1. A data storage comprising instructions that, when executed by processor circuitry of an electronic device, cause the electronic device to:
   access first location data corresponding to a location of a user of the electronic device, the first location data based on an output of a global positioning system (GPS) receiver of the electronic device;
   access second location data corresponding to locations of other users of remote electronic devices;
   cause a touchscreen of the electronic device to display a map of an area of the location of the user, an avatar of the user on the map, and avatars of the other users on the map;
   access images from a camera of the electronic device;
   detect a face of the user in the images;
   determine a motion of the face of the user exceeds a threshold;
   create an animation based on the motion of the face of the user exceeding the threshold;

cause the touchscreen to display the animation in response to the motion of the face of the user exceeding the threshold;

cause the touchscreen to display a name representing the location of the user; and cause communication circuitry of the electronic device to transmit a message to be accessed by another electronic device, the message indicative of the animation and the name representing the location of the user.

2. The data storage of claim 1, wherein the instructions, when executed, cause the electronic device to cause the touchscreen to display the name representing the location of the user in response to user selection of an icon on the touchscreen.

3. The data storage of claim 1, wherein the instructions, when executed, cause the electronic device to indicate the animation and the name in the message in response to user selection of the animation and the name.

4. The data storage of claim 1, wherein the instructions, when executed, cause the electronic device to cause the touchscreen to display the animation and the name simultaneously.

5. The data storage of claim 1, wherein the motion of the face of the user is a change in an expression of the face of the user.

6. The data storage of claim 1, wherein the motion of the face includes a movement of a mouth of the user.

7. The data storage of claim 1, wherein the instructions, when executed, cause the electronic device to cause the touchscreen to display an animated avatar that mimics a facial expression of the user.

8. The data storage of claim 1, wherein the instructions, when executed, cause the electronic device to:

access audio content from a microphone of the electronic device; and cause the communication circuitry to transmit data indicative of the audio content.

9. The data storage of claim 1, wherein the instructions, when executed, cause the electronic device to cause the touchscreen to display an image of a building associated with the location of the user, the message indicative of the image.

10. The data storage of claim 1, wherein the instructions cause the electronic device to cause the communication circuitry to transmit the message to a server to be accessed by the another electronic device.

11. The data storage of claim 1, wherein the message includes a video message.

12. The data storage of claim 1, wherein the threshold is configured to be settable by the user.

13. The data storage of claim 1, wherein the instructions, when executed, cause the electronic device to store the created animation.

14. The data storage of claim 13, wherein the stored animation is selectable to be displayed by the user.

15. The data storage of claim 1, wherein the instructions, when executed, cause the electronic device to display the created animation and one or more previously stored animations.

16. The data storage of claim 1, wherein the motion of the face of the user comprises a motion of a mouth of the user, and the threshold is a threshold for the motion of the mouth of the user.

17. A data storage comprising instructions to cause an electronic device to:

access first location data corresponding to a location of a user of the electronic device, the first location data based on an output of a global positioning system (GPS) receiver of the electronic device;

access second location data corresponding to locations of other users of remote electronic devices;

cause a touchscreen of the electronic device to display a map of an area of the location of the user in a first user interface, an avatar of the user on the map at the location of the user, and avatars of the other users on the map at the locations of the other users;

create an animation based on a detected motion of a face of the user exceeding a threshold;

cause the touchscreen to display the animation in response to the detected motion of the face of the user exceeding the threshold;

cause the touchscreen to display a name representing the location of the user in a second user interface; and cause communication circuitry of the electronic device to transmit a message to be accessed by another electronic device, the message including the name representing the location of the user.

18. The data storage of claim 17, wherein the instructions are to cause the electronic device to cause the touchscreen to display the name representing the location of the user in response to user selection of an icon on the touchscreen.

19. The data storage of claim 17, wherein the instructions are to cause the electronic device to cause the touchscreen to display an image that mimics a facial expression of the user.

20. The data storage of claim 19, wherein the instructions are to cause the electronic device to cause the touchscreen to display the image and the name simultaneously.

21. The data storage of claim 17, wherein the instructions are to cause the electronic device to:

access audio content from a microphone of the electronic device; and cause the communication circuitry to transmit audio data indicative of the audio content.

22. The data storage of claim 17, wherein the instructions are to cause the electronic device to cause the touchscreen to display an image of a building associated with the location of the user, the message including of the image.

23. The data storage of claim 17, wherein the instructions are to cause the electronic device to cause the communication circuitry to transmit the message to a server to be accessed by the another electronic device.

24. The data storage of claim 17, wherein the threshold is configured to be settable by the user.

25. The data storage of claim 17, wherein the instructions are to cause the electronic device to store the created animation.

26. The data storage of claim 25, wherein the stored animation is selectable to be displayed by the user.

27. The data storage of claim 17, wherein the instructions are to cause the electronic device to display the created animation and one or more previously stored animations.

28. The data storage of claim 17, wherein the motion of the face of the user comprises a motion of a mouth of the user, and the threshold is a threshold for the motion of the mouth of the user.

29. An electronic device comprising:
a global position system (GPS) receiver;
a camera;
a touchscreen;
machine readable instructions;
processor circuitry to execute the instructions to:
- determine a location of a user of the electronic device based on an output of the GPS receiver;
- access locations of other users of remote electronic devices;
- cause the touchscreen to display a map, a representation of the user on the map at the location of the user, and representations of the other users on the map at the locations of the other users;
- access images from the camera;
- detect a face of the user;
- create an animation corresponding to a motion of the face of the user exceeding a threshold;
- cause the touchscreen to display the animation; and
- cause the touchscreen to display a name associated with the location of the user; and communication circuitry to transmit a message to be accessed by another electronic device, the message indicative of the animation and the location of the user.

30. The electronic device of claim 29, wherein the processor circuitry is to include the animation and the location in the message in response to user selection of the animation and the name.

31. The electronic device of claim 29, wherein the touchscreen is to display the animation and the name simultaneously.

32. The electronic device of claim 29, wherein the touchscreen is to display a series of images that mimic a facial expression of the user.

33. The electronic device of claim 29, further including a microphone, the communication circuitry to transmit audio data indicative of audio content obtained by the microphone.

34. The electronic device of claim 29, wherein the touchscreen is to display an image of a building associated with the location of the user, the message indicative of the image.

35. The electronic device of claim 29, wherein the communication circuitry is to transmit the message to a server.

36. The electronic device of claim 29, wherein the threshold is configured to be settable by the user.

37. The electronic device of claim 29, wherein the processor circuitry is to store the created animation.

38. The electronic device of claim 37, wherein the stored animation is selectable to be displayed by the user.

39. The electronic device of claim 29, wherein the instructions are to cause the electronic device to display the created animation and one or more previously stored animations.

40. The electronic device of claim 29, wherein the motion of the face of the user comprises a motion of a mouth of the user, and
the threshold is a threshold for the motion of the mouth of the user.

* * * * *